(12) United States Patent
Craig et al.

(10) Patent No.: US 7,136,477 B2
(45) Date of Patent: Nov. 14, 2006

(54) METHODS AND SYSTEMS FOR PROVIDING END OFFICE SUPPORT IN A SIGNALING NETWORK

(75) Inventors: Jeffrey Alan Craig, Chapel Hill, NC (US); Mac Ernest Davidson, Chapel Hill, NC (US); Seetharaman Khadri, Durham, NC (US); David Michael Sprague, Raleigh, NC (US)

(73) Assignee: Tekelec, Calabasas, CA (US)

( * ) Notice: Subject to any disclaimer, the term of this patent is extended or adjusted under 35 U.S.C. 154(b) by 424 days.

(21) Appl. No.: 10/222,457

(22) Filed: Aug. 16, 2002

(65) Prior Publication Data

US 2003/0108067 A1 Jun. 12, 2003

Related U.S. Application Data

(60) Provisional application No. 60/312,984, filed on Aug. 16, 2001.

(51) Int. Cl.
*H04J 3/12* (2006.01)
*H04L 12/66* (2006.01)
*H04M 7/00* (2006.01)

(52) U.S. Cl. .............. 379/230; 370/352; 370/401; 370/524; 379/221.08; 379/221.1; 379/221.14

(58) Field of Classification Search ............ 370/352, 370/353, 400, 401, 467, 522, 524; 379/219, 379/220.01, 221.08, 221.09, 221.1, 221.14, 379/220

See application file for complete search history.

(56) References Cited

U.S. PATENT DOCUMENTS

| | | | | |
|---|---|---|---|---|
| 5,384,840 A | * | 1/1995 | Blatchford et al. ......... 379/230 |
| 5,430,719 A | * | 7/1995 | Weisser, Jr. ............... 370/389 |
| 5,438,568 A | * | 8/1995 | Weisser, Jr. ............... 370/389 |
| 5,440,626 A | * | 8/1995 | Boyle et al. ............... 379/219 |
| 5,454,034 A | * | 9/1995 | Martin ........................ 379/230 |
| 5,481,673 A | * | 1/1996 | Michelson ................. 709/242 |
| 5,680,437 A | * | 10/1997 | Segal ........................ 379/15.01 |
| 6,324,183 B1 | * | 11/2001 | Miller et al. ............... 370/467 |
| 6,487,286 B1 | * | 11/2002 | Reaves et al. ........... 379/221.1 |
| 6,507,649 B1 | | 1/2003 | Tovander ................... 379/230 |
| 6,515,985 B1 | | 2/2003 | Shmulevich et al. ....... 370/356 |
| 6,522,741 B1 | * | 2/2003 | Crowl ................... 379/207.11 |
| 6,606,379 B1 | * | 8/2003 | Khadri et al. .......... 379/221.1 |
| 6,678,242 B1 | * | 1/2004 | Simon ........................ 370/218 |
| 2001/0033549 A1 | * | 10/2001 | Yi .............................. 370/236 |
| 2002/0131427 A1 | * | 9/2002 | Niermann ................. 370/401 |
| 2002/0196779 A1 | * | 12/2002 | Khadri et al. ............. 370/352 |
| 2003/0118001 A1 | * | 6/2003 | Prasad et al. ............. 370/352 |

* cited by examiner

*Primary Examiner*—Harry S. Hong
(74) *Attorney, Agent, or Firm*—Jenkins, Wilson & Taylor P.A.

(57) ABSTRACT

An end office support (EOS) routing node implements MTP layers 1–3 on behalf of one or more remote applications that share the true point code of the EOS routing node. Implementing MTP layers 1–3 includes receiving messages addressed to the true point code, determining whether the messages are contain application level information of interest to a remote application, and forwarding the application level information to the remote application. Messages may be routed internally within the EOS routing node using an internal point code used to uniquely identify the remote application within the EOS routing node. The EOS routing node may also perform network management functions on behalf of one or more remote applications.

45 Claims, 13 Drawing Sheets

METHODS AND SYSTEMS FOR PROVIDING END OFFICE SUPPORT IN A SIGNALING NETWORK

RELATED APPLICATIONS

This application claims the benefit of U.S. provisional patent application No. 60/312,984, filed Aug. 16, 2001, the disclosure of which is incorporated herein by reference in its entirety.

TECHNICAL FIELD

The present invention relates to methods and systems for sharing point codes between routing nodes and remote applications. More particularly, the present invention relates to methods and systems to sharing a point code between a routing node and one or more attached end offices and/or other applications.

BACKGROUND ART

Conventional telecommunications networks include two distinct communication pathways or subnetworks—a voice network and a signaling network. These two networks function in a cooperative manner to facilitate calls between users. As implied by its name, the voice network handles the transmission of voice (or user data) information between users. The signaling network has a number of responsibilities, which include call setup, call tear down, and database access features. In simple terms, the signaling network facilitates the dynamic linking together of discrete voice-type communication circuits such that voice connections are established between end users. Additionally, the signaling network provides a framework through which non-voice-related information may be transported. This data and transport functionality is transparent to the users. This signaling technique is often referred to as out-of-band signaling, where the term "band" implies voice band. The signaling protocol most commonly employed in communication networks around the world is the signaling system 7 (SS7) protocol, which is also referred to as the common channel signaling (CCS) or CCS7 protocol.

From a hardware perspective, an SS7 network includes a plurality of SS7 nodes, generically referred to as signaling points (SPs). SS7 nodes are interconnected using signaling links. At least three major types of SPs may be included in an SS7 network: service switching points (SSPs), signal transfer points (STPS) and service control points (SCPs). Within an SS7 signaling network, each SP is assigned an SS7 network address, which is referred to as a point code (PC).

An SSP is normally installed in Class 4 tandem or Class 5 end offices. The SSP is capable of handling both in-band signaling and SS7 signaling. An SSP can be a customer switch, an end office, an access tandem and/or a tandem. An STP transfers signaling messages from one signaling link to another. STPs are packet switches and are generally installed as mated pairs. Finally, SCPs control access to databases, such as 800 number translation databases, caller identification databases, credit card verification databases, etc.

A simplified example of an SS7 signaling network, generally indicated by reference numeral 100, is presented in FIG. 1. In FIG. 1, SS7 network 100, which includes an STP 102, a first SSP or end office (EO) 104, and a second end office 106. As illustrated in FIG. 1, each SS7 network node is assigned a point code that uniquely identifies each node within the context of the SS7 network. For example, STP 102 is assigned a point code of 1-0-0, end office 104 is assigned a point code of 2-0-0, and end office 106 is assigned a point code of 2-0-1.

Signaling links are transmission facilities used to connect SPs. Conventional signaling links are dedicated bi-directional facilities operating at 56 kbps in the U.S. and Canada and at 64 kbps when clear channel capability is deployed. Normally, links are installed in pairs for redundancy and enhanced network integrity.

In some modern networks, traditional 56 kbps dedicated SS7 signaling links may be replaced by high-speed signaling links, such as Internet protocol (IP) or asynchronous transfer mode (ATM) signaling links. With particular regard to IP signaling links, the need for such links has arisen in response to the increasing convergence of traditional telecommunications networks and traditional data networks. As this converged network environment continues to evolve, so will the tendency of network operators to place SSP end office nodes within the data network or IP component of the converged network environment. PSTN and wireless telephone network operators will likely find the economics of data network operation favorable to the placement of end office nodes within the data component of the converged network environment, as opposed to the traditional PSTN-SS7 network component. Examples of SSP-like nodes that may be placed in the data network include media gateways (MG) and media gateway controller (MGC) or softswitch (SS) nodes.

In a converged SS7-IP network environment, SS7-capable nodes may be located in an IP network and assigned an IP address. However, in addition to an IP address, such IP-based SSP or end office facilities also require an SS7 point code in order to be accessible to and inter-operable with other nodes in the SS7 network.

FIG. 2 illustrates an exemplary converged SS7-IP network environment, generally indicated by reference numeral 110. In FIG. 2, network 110 includes STP 102 and end office nodes 104 and 106 as described above. In addition, network 110 includes a signaling gateway 112 and a media gateway controller 114. As illustrated in FIG. 2, each node, including MGC 114, in the converged signaling network 110 is assigned a unique SS7 point code address. MGC 114 is also assigned an IP address.

A primary reason for the dual addressing of IP-based SS7 nodes involves network management services as provided by the message transfer part (MTP) portion of the SS7 signaling protocol. That is, in order to communicate with other SS7 nodes, an IP-based SS7 node must have its own point code and must also participate in SS7 network management protocols. A detailed description of such converged SS7-IP signaling network management issues is presented in commonly-assigned, co-pending U.S. patent application No. 09/770,316, filed Jan. 26, 2001, and entitled Methods And Systems For Providing Converged Network Management Functionality In A Gateway Routing Node (hereinafter, "SG Network Management Patent Application"), the disclosure of which is incorporated herein by reference in its entirety. Briefly, the SG Network Management Patent Application discloses a signaling gateway that includes SS7 and IP routing capabilities. When a node or signaling link in an SS7 network goes down, the signaling gateway determines nodes in the IP network that are configured to communicate with the out-of-service node. The signaling gateway notifies these nodes in the IP network to prevent these nodes from attempting to communicate with the out-of-service node or signaling link.

The signaling gateway described in the SG Network Management Patent Application also receives audit messages from nodes in the IP network requesting the status of nodes in the SS7 network. If two or more audit messages regarding the same SS7 node are received within a predetermined time period, the signaling gateway discards the redundant audit messages. This prevents flooding of audit messages in the SS7 network by nodes in the data network. Thus, the SG Network Management Patent Application addresses several problems associated with providing network management in a converged SS7-IP signaling environment. However, the SG Network Management Patent Application does not address problems associated with requiring unique point codes to be assigned to IP nodes in the IP network.

SS7 network point codes are a finite resource that is being rapidly consumed by SS7 network operators. As a result, point codes have become a valuable commodity in recent years. Consequently, network operators that choose to deploy IP-based signaling nodes (e.g., MGC/softswitch nodes) are faced with the problem of consuming valuable SS7 point codes. Therefore, what is needed is a system and method of enabling a network operator to deploy data-network-based (e.g., IP, ATM, etc.) signaling nodes in a converged SS7-data network environment while minimizing or eliminating the need to assign unique point codes to such data-network-based signaling nodes.

Disclosure of the Invention

The present invention includes a network routing element such as a signaling system 7 signal transfer point or signaling gateway, that shares its SS7 point code with a remote application residing in a data network. Remote applications may include Internet-protocol-based signaling end office facilities, such as media gateways, media gateway controllers, and IP-SS7 service switching points. An end office support (EOS) routing node receives signaling messages addressed to an SS7 point code that is shared by the EOS routing node and a remote application. The EOS routing node examines one or more parameters contained in the messages in order to determine whether the messages are intended for the EOS routing node or the remote application. In response to determining that the messages are intended for the remote application, the SS7 messages are forwarded to the remote application using the remote application's data network address.

An EOS routing node also provides SS7 MTP layers 1 through 3 functionality, including network management functionality, on behalf of the remote application. Implementing network management functionality on behalf of a remote application may include terminating MTP3 network management messages destined to the remote application and forwarding higher-layer network management information to the remote application. In addition, when multiple remote applications share the point code of the EOS routing node, the EOS routing node filters network management messages and prevents network management messages caused by one of the applications from entering the network. Implementing network management functions on behalf of a remote application decreases the complexity of IP-based SS7 nodes because these nodes can implement higher SS7 layers without implementing MTP layers 1–3.

The functions for providing end office routing support are described herein as modules, applications, or processes. It is understood that these modules, applications, or processes may be implemented as computer-executable instructions embodied in a computer-readable medium. Alternatively, the modules, applications, or processes described herein may be implemented entirely in hardware. In yet another alternative, the modules, applications, or processes described herein may be implemented as a combination of hardware and software. Furthermore, the modules, applications, and processes for providing EOS routing functionality are described below as being associated with cards or subsystems within an STP or signaling gateway routing node. It is understood that these cards or subsystems include hardware for storing and executing the processes and modules. For example, each card or subsystems described below may include one or more microprocessors, such as an x86 microprocessor available from Intel Corporation, and associated memory.

Accordingly, it is an object of the present invention to provide a routing node that shares an SS7 point code with a remote application, such as a data-network-based media gateway or media gateway controller.

It is another object of the present invention to provide a routing node that shares an SS7 point code with and provides SS7 network management functionality on behalf of a remote SS7 level 4 application.

It is another object of the present invention to provide a system and method for deploying an SSP or SSP-like node in a communications network without requiring that the new node consume a new, unique SS7 point code.

It is another object of the present invention to provide a signaling message routing node that selectively terminates and forwards messages directed to a remote SS7 level 4 application.

It is another object of the present invention to provide a network routing node that performs SS7 protocol levels 1–3 operations on behalf of a remote SS7 level 4 application.

It is another object of the invention to prevent network management messages caused by failure of communications with one remote application from affecting communications with other remote applications that share the point code of an end office support routing node.

Some of the objects of the invention having been stated hereinabove, other objects will become evident as the description proceeds, when taken in connection with the accompanying drawings as best described hereinbelow.

BRIEF DESCRIPTION OF THE DRAWINGS

Preferred embodiments of the invention will now be discussed with reference to the accompanying drawings, of which.

DETAILED DESCRIPTION OF THE INVENTION

Figure 1:
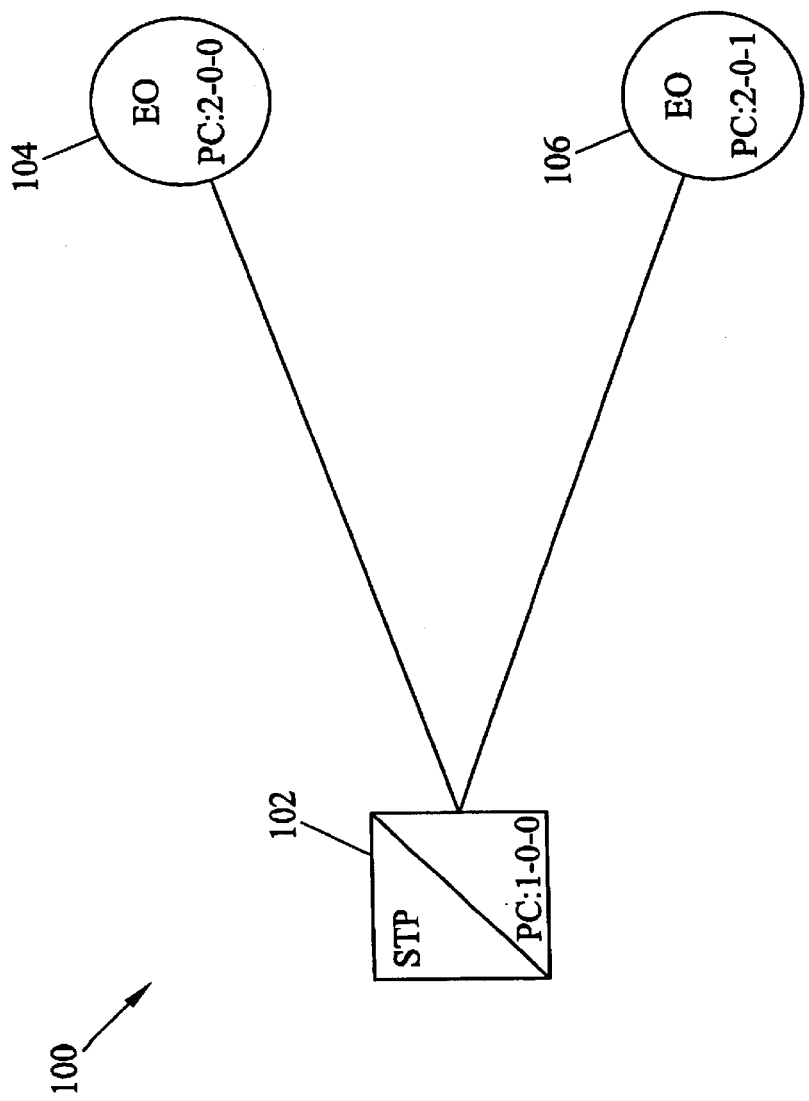
FIG. 1 is a network diagram illustrating a conventional signaling system 7 signaling network environment.
Figure 2:
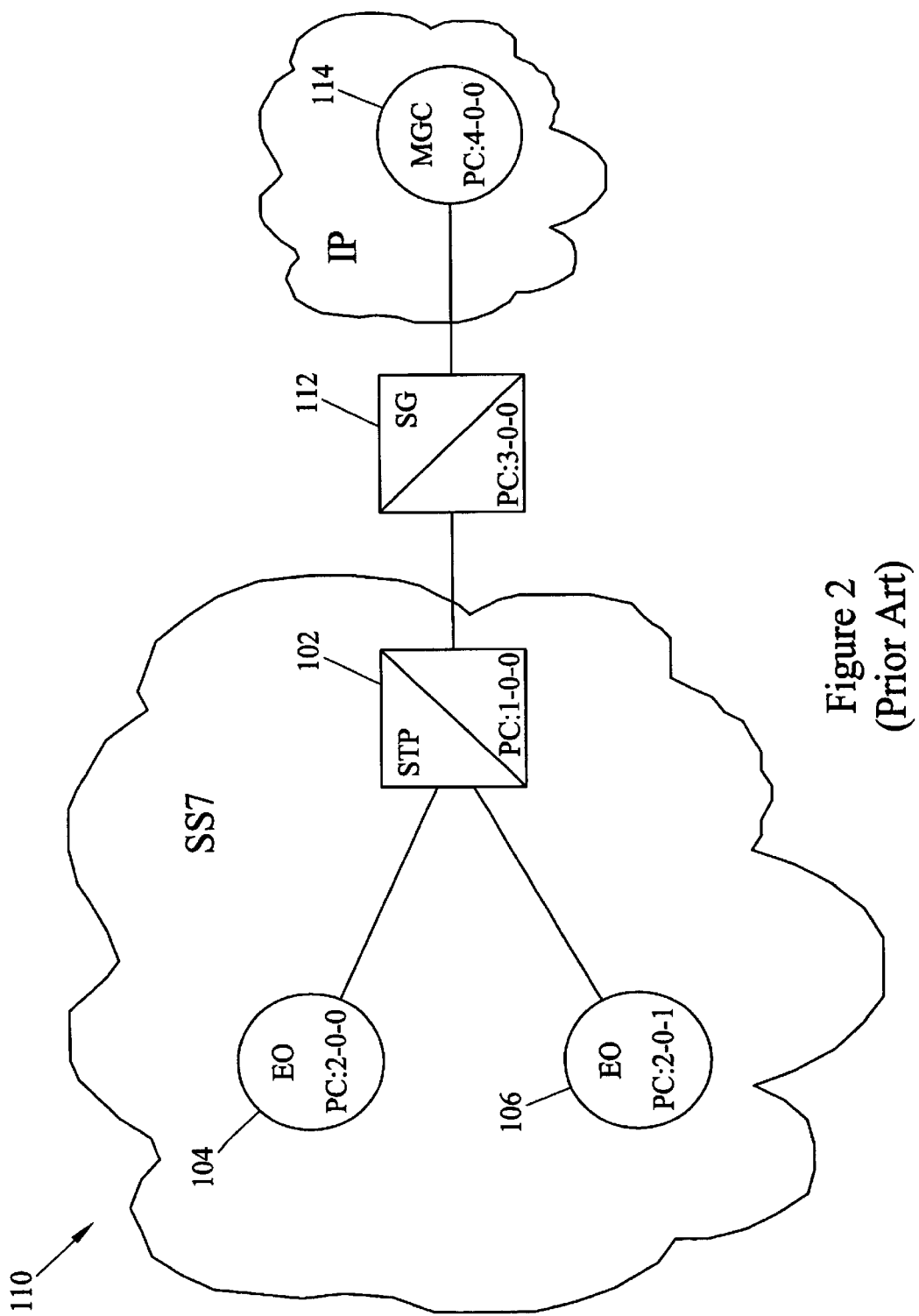
FIG. 2 is a network diagram illustrating a converged SS7-IP signaling network environment.
Figure 3:
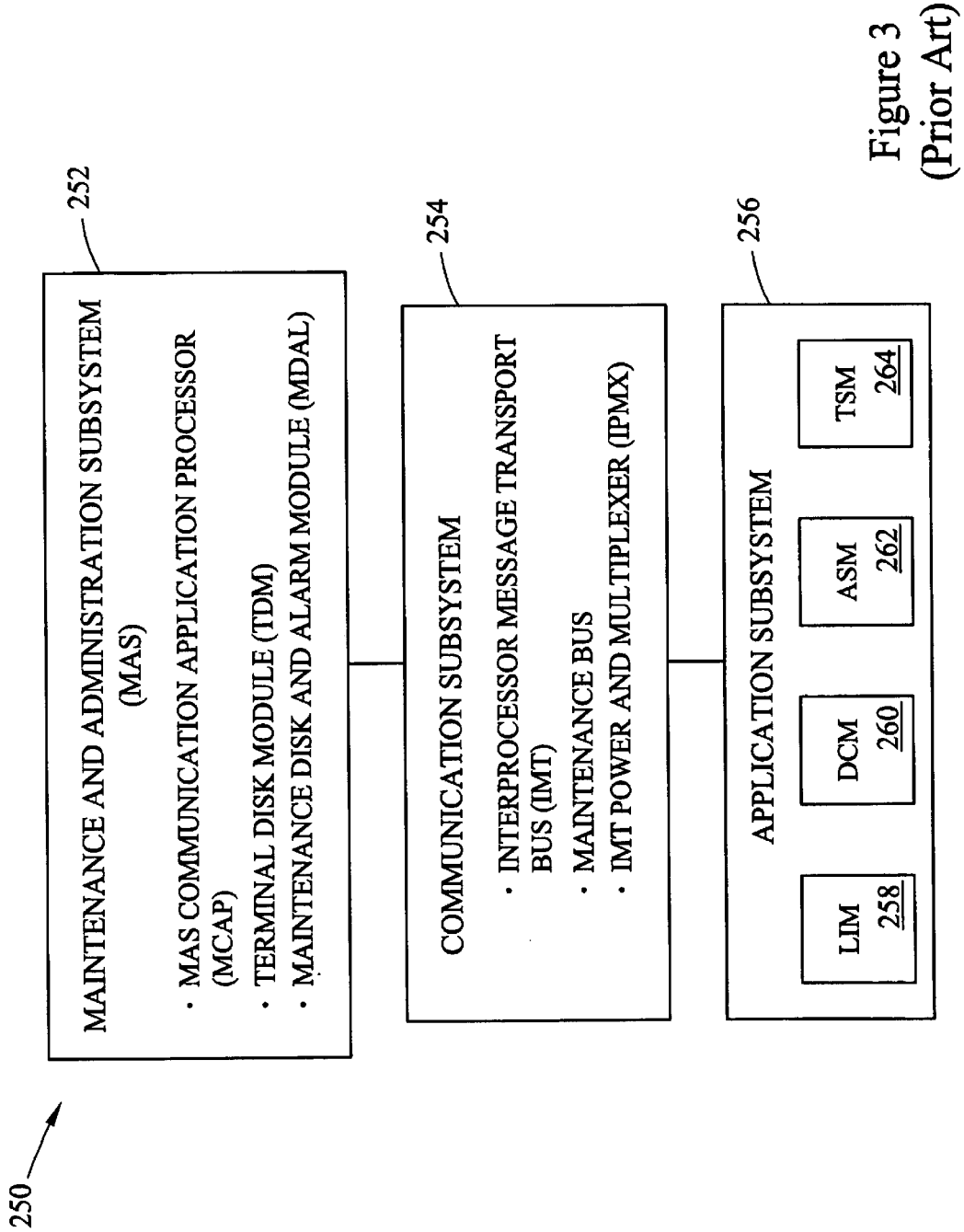
FIG. 3 is a block diagram of a routing node architecture suitable for use with embodiments of the present invention.

Embodiments of the present invention may include an underlying hardware platform similar to a signaling system 7 signal transfer point or signaling gateway (SG) routing node. Exemplary STP or SG hardware platforms suitable for use with embodiments of the present invention include the EAGLE® STP and the IP7™ Secure Gateway, both available from Tekelec of Calabasas, Calif. A block diagram that generally illustrates the base internal architecture of the IP7™ Secure Gateway is shown in FIG. 3. In FIG. 3, an IP7 Secure Gateway™ 250 includes the following subsystems: a maintenance and administration subsystem (MAS) 252, a communication subsystem 254, and an application subsystem 256. MAS 252 provides maintenance communications, initial program loading, peripheral services, alarm processing and system disks. Communication subsystem 254 includes an interprocessor message transport (IMT) bus that is the main communication bus among all subsystems in IP7 Secure Gateway™ 250. The IMT bus includes two 1 Gbps counter-rotating serial rings.

Application subsystem 256 includes application cards capable of communicating with the other cards through the IMT bus. Numerous types of application cards can be incorporated into SG 250, including: a link interface module 258 that interfaces with SS7 links and X.25 links, a data communication module 260 that provides a TCP/IP or SCTP/IP interface, and an application service module (ASM) 262 that provides global title translation, gateway screening and other services. A translation service module (TSM) 264 may also be provided to support triggered local number portability service. A detailed description of the IP7™ Secure Gateway may be found in Tekelec publication PN/909-0767-01, Rev B, August 1999, entitled Feature Notice IP7 Secure Gateway™ Release 1.0, the disclosure of which is incorporated by reference in its entirety. Similarly, a detailed description of the Eagle® STP may be found in the Eagle® Feature Guide PN/910-1225-01, Rev. B, January 1998, published by Tekelec, the disclosure of which is incorporated herein by reference in its entirety.

End Office Support Routing Node Architecture

Figure 4:
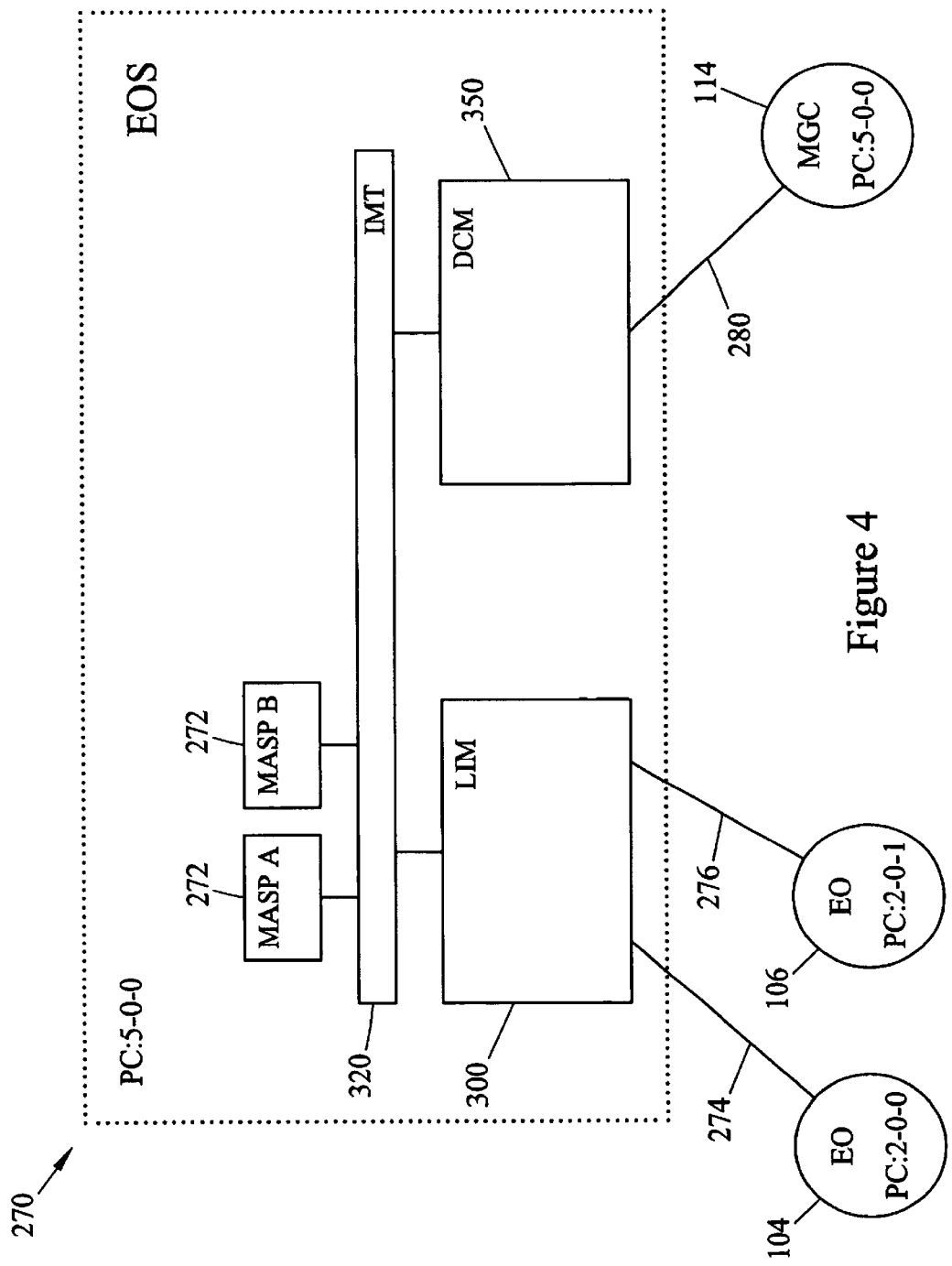
FIG. 4 is a block diagram of an end office support routing node according to an embodiment of the present invention.

FIG. 4 illustrates an EOS routing node according to an embodiment of the present invention, generally indicated by reference numeral 270. In FIG. 4, EOS routing node 270 is coupled to a pair of SS7 end office nodes 104 and 106 via SS7 signaling links 274 and 276, respectively. EOS routing node 270 is further coupled to an IP-based media gateway controller node 114 via an IP connection 280.

As further illustrated in FIG. 4, EOS routing node 270 includes a high-speed IMT bus 320. A number of distributed processing modules or cards may be coupled to bus 320. In FIG. 4, these modules include: a pair of maintenance and administration subsystem processors (MASPs) 272, an SS7-capable LIM 300, and an IP-capable DCM 350. These modules are physically connected to IMT bus 320 such that signaling and other types of messages may be routed internally between active cards or modules. For simplicity of illustration, only a single LIM 300 and a single DCM 350 are included in FIG. 4. However, it should be appreciated that the distributed, multi-processor architecture of EOS routing node 270 facilitates the deployment of multiple LIM, DCM and other cards, all of which may be simultaneously connected to and communicating via IMT bus 320.

From a hardware perspective, LIM 300 and DCM 350 may each comprise a printed circuit board physically connected to IMT bus 320. Each printed circuit board may include a communication processor programmed to send and receive messages via IMT bus 320. Each printed circuit board may also include an application processor programmed to perform various functions. For example, the application processor of DCM 350 may be programmed to perform the functions described herein for implementing SS7 layers 1–3 on behalf of one of more remote applications.

MASP pair 272 implement the maintenance and administration subsystem functions described above. As MASP pair 272 are not particularly relevant to a discussion of the EOS support attributes of the present invention, a detailed discussion of their function is not provided herein. For a comprehensive discussion of additional MASP operations and functionality, the above-referenced Tekelec IP7 Secure Gateway™ and Eagle® STP publications can be consulted.

Given the EOS routing node internal architecture shown in FIG. 4 and briefly described above, one operation of EOS routing node 270 involves the receipt of a signaling message at LIM 300 from an SS7 network node and the subsequent internal processing and routing of this message to DCM 350 for transmission to the IP-based MGC node 114. Since an EOS routing node of the present invention may share a point code with MGC 114, one aspect of the invention includes how an EOS routing node of the present invention screens and processes signaling messages that are addressed to the shared point code. Exemplary hardware and software that provide such functionality will be described in detail below.

LIM Architecture

Figure 5:
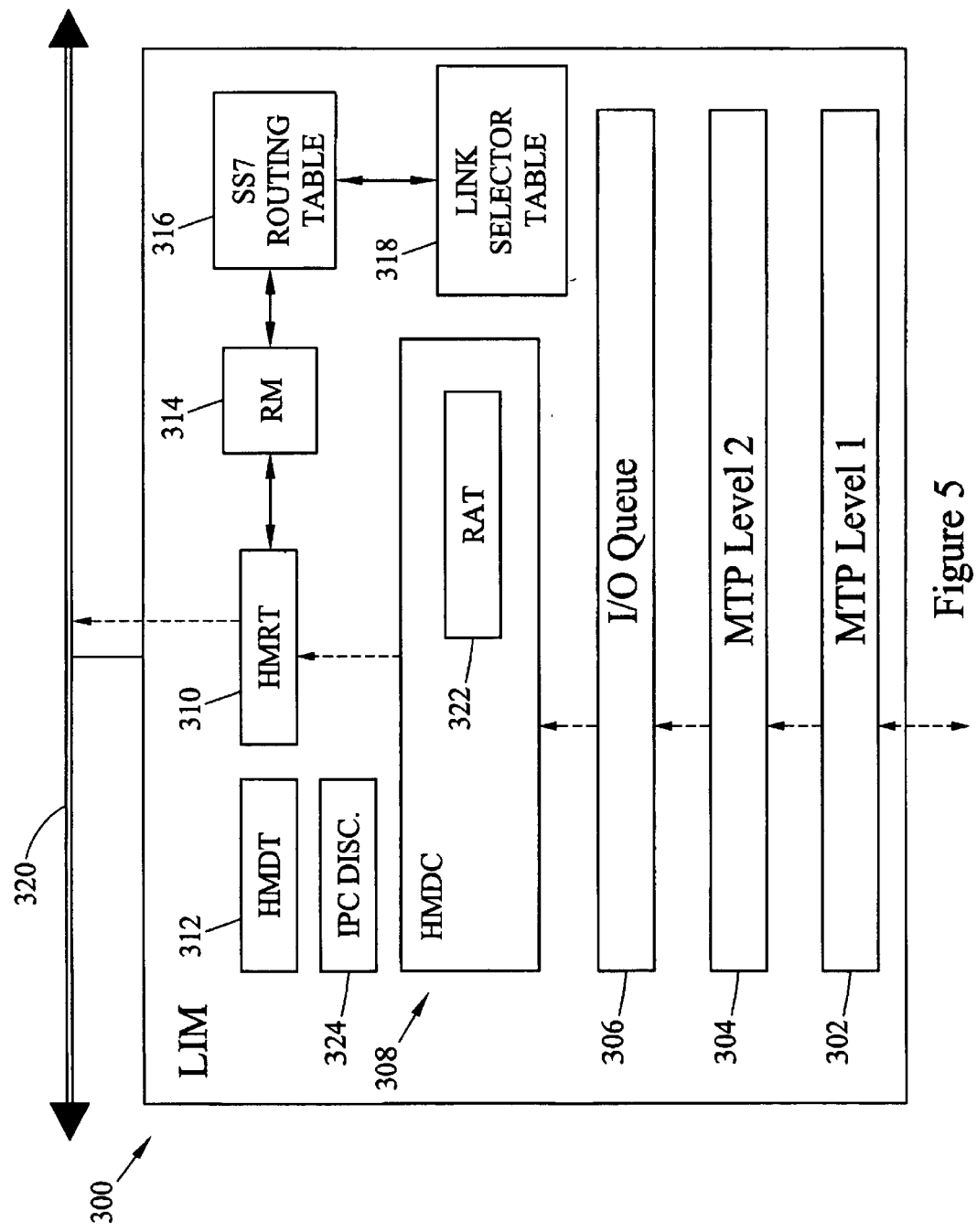
FIG. 5 is a block diagram of an SS7 link interface module (LIM) illustrating message flow associated with the receipt of a signaling message according to an embodiment of the present invention.

FIG. 5 illustrates an exemplary architecture for LIM 300 referring to FIG. 5, LIM 300 has a number of modules or processes that perform SS7 protocol functions. In FIG. 5, these modules or processes include an SS7 MTP level 1 module 302, an SS7 MTP level 2 module 304, an I/O buffer or queue 306, an SS7 MTP level 3 message handling and discrimination (HMDC) module 308, a message handling and routing (HMRT) module 310, a message handling and distribution (HMDT) module 312, a routing manager 314, a routing table 316, a link selector table 318, a remote application table 322, and an internal point code (IPC) discrimination module 324. MTP level 1 module 302 provides the facilities necessary to send and receive digital data over a particular physical media/physical interface (e.g., DS0, T1, E1, OC3, etc.). MTP level 2 module 304 performs error detection, error correction, and ensures sequenced delivery of SS7 message packets to higher layers. I/O queue 306 provides for temporary buffering of incoming and outgoing SS7 signaling message packets.

HMDC module 308 receives signaling messages from the lower protocol layers and performs a discrimination function, effectively determining whether an incoming SS7 message packet requires internal processing or is simply to be through-switched. Such discrimination may include examining a destination point code (DPC) parameter contained within a received signaling message. In one embodiment of the present invention, HMDC module 308 utilizes remote application table (RAT) 322 to internally route messages addressed to remote applications.

Table 1 shown below illustrates an exemplary remote application table. In Table 1, each entry includes a network type field, a true point code (TPC) field, a service indicator field, an internal point code (IPC) identifier field, a remote application assignment field, and an assigned SCCP subsystem (SSN) field. Table 1 also includes an "Action Taken" field, which indicates actions taken when an MSU is received that is addressed to the TPC in the TPC field. This field is shown for illustrative purposes and may not be included in RAT 322 illustrated in FIG. 5. In Table 1, the values stored in the network type, TPC, SI, and SSN fields may be used together to index the table. The IPC field stores internal point code values used to internally route messages within EOS routing node 270. In a preferred embodiment of the invention, an internal point code is uniquely associated with each remote application that shares a point code with EOS routing node 270. The assigned SCCP SSN field stores information that identifies one or more SCCP subsystems, which are assigned to the EOS routing node.

TABLE 1

Remote Application Table

| Network Type | TPC | SI | IPC | Assigned to Remote Appln. | Assigned SSNs | Action Taken When MSU is received for the TPC |
|---|---|---|---|---|---|---|
| ANSI | 5-0-0 | 0 | 9-9-9 | FALSE | n/a | Note that TFCs are processed, replicated and sent to an EO Node, if an application is assigned to SI > 0. UPUs are forwarded if the application specified by the affected SI is assigned. |
| | | 1 | | FALSE | n/a | |
| | | 2 | | FALSE | n/a | |
| | | 3 | | TRUE | 1, 3, 7, 100 | SCCP messages destined to a TPC and with SSN assigned are forwarded to an EO Node. SCCP messages destined to a TPC and SSN not assigned are distributed to subsystems local to the EOS routing node (e.g. LNP). |
| | | 4 | | FALSE | n/a | Terminate with UPU. |
| | | 5 | | TRUE | n/a | ISUP messages destined to a TPC are forwarded to the EO Node. |
| | | 6 | | FALSE | n/a | Terminate with UPU. |
| | | 7 | | FALSE | n/a | Terminate with UPU. |
| | | 8 | | FALSE | n/a | Terminate with UPU. |
| | | 9 | | FALSE | n/a | Terminate with UPU. |
| | | 10 | | FALSE | n/a | Terminate with UPU. |
| | | 11 | | FALSE | n/a | Terminate with UPU. |
| | | 12 | | FALSE | n/a | Terminate with UPU. |
| | | 13 | | FALSE | n/a | Terminate with UPU. |
| | | 14 | | FALSE | n/a | Terminate with UPU. |
| | | 15 | | FALSE | n/a | Terminate with UPU. |
| ITU-N | 5-0-1 | 0 | 110 | FALSE | n/a | Note that TFCs are processed, replicated and sent to an EO Node, if an application is assigned to SI > 0. UPUs are forwarded if the application specified by the affected SI is assigned. |
| | | 1 | | FALSE | n/a | |
| | | 2 | | FALSE | n/a | |
| | | 3 | | FALSE | NULL | Distribute to local SCCP. |
| | | 4 | | TRUE | n/a | TUP messages destined to a TPC are forwarded to the EO Node. |
| | | 5 | | FALSE | n/a | Terminate with UPU. |
| | | 6 | | FALSE | n/a | Terminate with UPU. |
| | | 7 | | FALSE | n/a | Terminate with UPU. |
| | | 8 | | FALSE | n/a | Terminate with UPU. |
| | | 9 | | FALSE | n/a | Terminate with UPU. |
| | | 10 | | FALSE | n/a | Terminate with UPU. |
| | | 11 | | FALSE | n/a | Terminate with UPU. |
| | | 12 | | FALSE | n/a | Terminate with UPU. |
| | | 13 | | TRUE | n/a | QBICC messages destined to a TPC are forwarded to the EO Node. |
| | | 14 | | FALSE | n/a | Terminate with UPU. |
| | | 15 | | FALSE | n/a | Terminate with UPU. |
| ITU-I | 5-0-2 | 0 | 0-9-1 | FALSE | n/a | Note that TFCs are processed, replicated and sent to an EO Node, if an application is assigned to SI > 0. UPUs are forwarded if the application specified by the affected SI is assigned. |
| | | 1 | | FALSE | n/a | |
| | | 2 | | FALSE | n/a | |
| | | 3 | | FALSE | NULL | Distribute to local SCCP. |
| | | 4 | | TRUE | n/a | TUP messages destined to a TPC are forwarded to the EO Node. |
| | | 5 | | FALSE | n/a | Terminate with UPU. |
| | | 6 | | FALSE | n/a | Terminate with UPU. |
| | | 7 | | FALSE | n/a | Terminate with UPU. |
| | | 8 | | FALSE | n/a | Terminate with UPU. |
| | | 9 | | FALSE | n/a | Terminate with UPU. |
| | | 10 | | FALSE | n/a | Terminate with UPU. |
| | | 11 | | FALSE | n/a | Terminate with UPU. |
| | | 12 | | FALSE | n/a | Terminate with UPU. |
| | | 13 | | FALSE | n/a | Terminate with UPU. |
| | | 14 | | FALSE | n/a | Terminate with UPU. |
| | | 15 | | FALSE | n/a | Terminate with UPU. |

With regard to the indexing parameters in Table 1, the network type identifier stored in the network type identifier field may be compared to network type identifiers extracted or derived from received signaling messages to determine the type of network from which a signaling message is received. Examples of network types encountered in an SS7 signaling environment include: American National Standards Institute (ANSI), International Telecommunications Union-National (ITU-N), and International Telecommunications Union-International (ITU-I). The service indicator field includes values that correlate with SI parameter values contained in the MTP routing label of a received SS7 or IP-encapsulated SS7 signaling message.

As stated above, an IPC value is an SS7 point code the uniquely identifies a remote application that shares a point code with EOS routing node 270. However, an IPC value preferably only has significance or relevance within EOS routing node 270. That is, an IPC may be used for internal message routing and processing but may be removed from the message before the message is sent over an external network. The present invention is not limited to using an internal point code to route signaling messages within an EOS routing node. Other parameters, such as non-SS7 identifiers may also be used to provide similar IPC functionality within an EOS routing node of the present invention.

EOS routing node 270 may implement various network management functions on behalf of one or more remote applications. Table 2 shown below illustrates exemplary network management functions that EOS routing node 270 may perform on behalf of a remote application that shares its point code. Such functions may be performed by MTP3 network management applications executing on any card within EOS routing node 270 that implements MTP3 functions.

TABLE 2

Sample EOS Signaling Network Management Processing Rules

| SNM Category | SNM Message Type | Action When Received | Generating Entity |
|---|---|---|---|
| CHM | COO COA X_COO X_COA CBD CBA | Processed as for TPC. Not forwarded to remote application. | Generated by EOS on behalf of remote application. |
| DLM | DLC CSS CNS CNP | Processed as for TPC. Not forwarded to remote application. | Generated by EOS on behalf of remote application. |
| ECM | ECO ECA | Processed as for TPC. Not forwarded to remote application. | Generated by EOS on behalf of remote application. |
| FCM | RCT | The EOS abates congestion on behalf of the remote application. Processed as for TPC. Not forwarded to remote application. | Generated by EOS on behalf of remote application. A remote application can generate using MTPP, but this behavior is not recommended, since this results in excessive RCTs (sent by both EOS and remote application). |
| | TFC | The EOS abates congestion on behalf of the remote application. Processed as for TPC. Replicated to remote application using MTPP. | Generated by EOS on behalf of remote application. |
| MIM | LIN LUN LIA LUA LID LFU LLI LRI | Processed as for TPC. Not forwarded to remote application. | Generated by EOS on behalf of remote application. |
| RSM | RSP RSR RCP RCR | Processed as for TPC. Not forwarded to remote application. | Generated by EOS on behalf of remote application. |
| TFM | TFP TCP TFA TCA | Processed as for TPC and replicated to remote application using MTP Primitive (MTPP). | If concerning remote application, then generated internally by EOS on behalf of remote application, but not transmitted. If not concerning remote application, then gener- |

TABLE 2-continued

Sample EOS Signaling Network Management Processing Rules

| SNM Category | SNM Message Type | Action When Received | Generating Entity |
|---|---|---|---|
| | | | ated and transmitted as usual. |
| | TFR TCR | Processed as for TPC. Not forwarded to remote application. | May be generated by EOS, but never on behalf of a remote application. |
| TRM | TRA TRW | Processed as for TPC. Not forwarded to remote application. | Generated by EOS on behalf of remote application. |
| UFC | UPU | Forwarded to remote application if concerned SI is assigned, otherwise processed as for TPC. | May be generated by EOS or by remote application. |

In Table 2, the network management processing rules include a signaling network management (SNM) category, an SNM message type, a general processing description, and generating entity comments. The SNM category field indicates the category of the network management message. The SNM message type field indicates the network management messages within each category. The processing description field indicates exemplary actions taken by EOS routing node 270 for each category on behalf of a remote application. The generating entity comments field indicates the originator of network management messages in each category.

As illustrated in Table 2, EOS routing node 270 performs many MTP network management functions on behalf of a remote application. As a result, remote application design is simplified. Processing examples for some of the network management messages illustrated in Table 2 will be described in detail below. However, detailed processing examples are not repeated for all of the types of messages illustrated in Table 2. Those skilled in the art of SS7 communications will appreciate that the message categories and types are well known in the telecommunications industry, and as such a detailed discussion of each SNM message is not presented herein. A comprehensive discussion of SS7 network management messages and related issues can be found in Signaling System #7 by Travis Russell, McGraw-Hill Publishing 1998.

In general, EOS routing node 270 terminates MTP3 network management messages on behalf of a remote application. However, in certain cases, a network management message may contain information that is of interest to a remote SS7 level 4 application. That is, it may be desirable to replicate some or all of the information contained in a network management message and distribute that information internally within EOS routing node 270 as well as to a remote application. Certain network management messages may specify information associated with a "concerned" network element or application, including a concerned point code (CPC) and concerned signaling indicator (CSI) parameter. Such identifying information may also be used by an EOS routing node 270 to determine how to process and/or route a signaling message that is addressed to a point code shared by EOS routing node 270 and a remote application.

Returning to a discussion of LIM 300, HMDT module 312 internally distributes SS7 messages received from the discrimination module 308 that are destined for a locally provisioned subsystem, such as a local number portability (LNP) or global title translation (GTT) subsystem. HMRT module 310 receives messages from discrimination module 308 and routes the messages to an appropriate communication module.

Data structures 316 and 318 contain signaling route and signaling route status information, along with internal IMT bus routing information. Table 3 shown below illustrates an exemplary structure and associated data for the SS7 route data structure 316.

TABLE 3

SS7 Routing Data

| DPC | Route Cost | Linkset Status | Adjacent Status | Overall Status | Linkset Name |
|---|---|---|---|---|---|
| 9-9-9 | 10 | A | A | A | LS1 |
| 9-9-9 | 20 | P | A | P | LS2 |
| 1-0-1 | 10 | A | A | A | LS3 |
| 1-0-1 | 20 | A | P | P | LS4 |
| 1-1-2 | 10 | A | A | A | LS5 |
| 1-1-2 | 20 | A | A | A | LS6 |
| 2-0-0 | 10 | A | A | A | LS7 |
| 2-0-0 | 20 | A | A | A | LS8 |
| 2-0-1 | 10 | A | A | A | LS9 |
| 2-0-1 | 20 | A | A | A | LS10 |
| 2-2-3 | 10 | A | A | A | LS11 |
| 2-2-3 | 20 | A | A | A | LS12 |

In Table 3, the routing data includes a destination point code (DPC) key field, which may be used to index the table. In the illustrated embodiment, DPC values in the DPC field are in ANSI format. In an alternate embodiment of the invention, multiple DPC key fields, each corresponding to a different signaling protocol point code addressing scheme, may also be employed. For example, one DPC key field signaling protocol may be used to accommodate an ANSI point code format, while a another DPC key field may be used to accommodate an ITU-I point code format, and yet another DPC field may store an ITU-N point code format. ITU national and international signaling protocols utilize a 14-bit point code, while the ANSI signaling protocol employs a 24-bit point code-addressing scheme. However, for simplicity of illustration, only ANSI-formatted DPC values are shown in Table 3.

According to an important aspect of the invention, the DPC field in the routing table may be provisioned with IPC values for remote applications that share a point code with EOS routing node 270. In the example illustrated above, one entry in the routing table includes a DPC value of 9-9-9, which may be an IPC value assigned to an IP-enabled end office. Provisioning IPC values in an SS7 routing table also enables SS7 routing functions to be used to distribute messages within EOS routing node 270. For example, the IPC value in combination with other parameters in a message may be used to distribute a message to a subsystem within EOS routing node 270 for additional processing, such as GTT processing.

In addition to the DPC field, Table 3 includes a route cost field, a linkset status field, an adjacent node status field, an overall status field, a linkset identifier or pointer field, and a secondary point code field. The route cost field includes a value that indicates the relative cost associated with the route. The linkset status field includes an identifier or value that indicates the status of the signaling link associated with the particular DPC value. The adjacent status field stores values or identifiers that indicate whether or not the linkset associated with an adjacent node is available. The overall status field stores values that indicate whether or not a linkset or an adjacent linkset is available. The linkset name field stores an identifier or value of the linkset associated with a particular destination point code.

Table 4 shown below illustrates an exemplary linkset data structure that may be used by an EOS routing node according to an embodiment of the present invention. Table 4 may be accessed using a compound key including a

TABLE 4

Linkset Data

| KEY(s) | | DATA FIELDS | | | |
|---|---|---|---|---|---|
| Linkset Name | Link | IMT/Card Address | Port | Link Status | Adjacent Point Code |
| LS1 | 0 | 1305 | A | A | 5-0-0 |
| LS1 | 1 | 1307 | B | U | 5-0-0 |
| LS2 | 1 | 1505 | B | A | 5-0-0 |
| LS2 | 2 | 2300 | A | A | 5-0-0 |
| LS5 | 0 | 3301 | A | A | 1-1-2 |
| LS5 | 1 | 3312 | B | A | 1-1-2 |
| LS11 | 0 | 1105 | A | A | 2-2-3 |
| LS11 | 1 | 1205 | A | A | 2-2-3 | linkset identifier and a signaling link. Table 4 includes IMT bus address and port fields that store IMT bus address and communication port information associated with communication modules that are connected to IMT bus 320. More particularly, a record in the linkset table includes an IMT address and communication port value associated with a communication module that supports the specific link identified in the record key. For example, as shown in Table 4, link 0 of linkset 1 resides on a communication module that has an IMT bus address of 1305 and a communication port address of "A." Furthermore, a link status field, indicates that link 0 of linkset 1 is available for service. Table 4 also includes an adjacent point code field that contains information that identifies the signaling node that is connected at the distant end of a signaling link.

A lookup in SS7 routing table 316 returns an index value or pointer used in a lookup link selection table 318. The ultimate result of this two-stage lookup procedure is an IMT bus address and communication port associated with a signaling link on a communication module. The present invention is not limited to the data structures illustrated in Tables 3 and 4 for routing received messages. Any data structure that takes a destination point code maps the point code to a linkset and a signaling link may be employed without departing from the scope of the invention. In addition, LIM 300 illustrated in FIG. 5 may include applications and databases other than those shown. The functionality illustrated in FIG. 5 is merely intended to illustrate the components of LIM 300 that may be used to provide end office support and the associated routing and distribution functionality according to embodiments of the present invention.

As described above, tables 316 and 318 facilitate the overall routing of an SS7 signaling message received by the LIM 300. Routing manager 314 performs a number of functions, including the administration of routing data within the SS7 routing and link selector tables 316 and 318. Routing manager 314 may also notify other communication modules (e.g., other LIMs or DCMs) of changes in the status of links and other nodes in the SS7 network when EOS routing node 270 receives such information via network management messages. In one embodiment of the present invention, routing manager 314 may receive an SS7 network management message, use information contained within the message to update route status information in SS7 routing table 316 and link selector table 318 and subsequently distribute the network management information to other communication modules connected to IMT bus 320.

The routing functionality associated with an inbound or received signaling message as described above for an SS7-

MTP LIM card is also provided on other types of communication modules (e.g., a TALI/TCP/IP DCM card) in an EOS routing node of the present invention. Thus, while such routing functionality may not be explicitly described for each communication module in EOS routing node 270, it is understood that each communications module may include MTP3-related routing functions and data structures described above with regard to LIM 300 may be present on other cards to process inbound SS7 messages.

In addition to having processing capability for inbound signaling messages, LIM 300 preferably also includes functionality for filtering outbound signaling messages. In the illustrated embodiment, LIM 300 includes an IPC discrimination process 324 for filtering outbound signaling messages and selectively preventing these messages from entering the network. Such functionality may be needed when a network management event is generated by one application that shares the point code of EOS routing node 270 but not another application that shares the point code of EOS routing node 270. In this case, IPC discrimination process 324 may prevent network management messages from entering the network. This reduces the likelihood that network management messages generated on behalf of one application will affect communications with another remote application.

Data Communication Module Architecture

Figure 6:
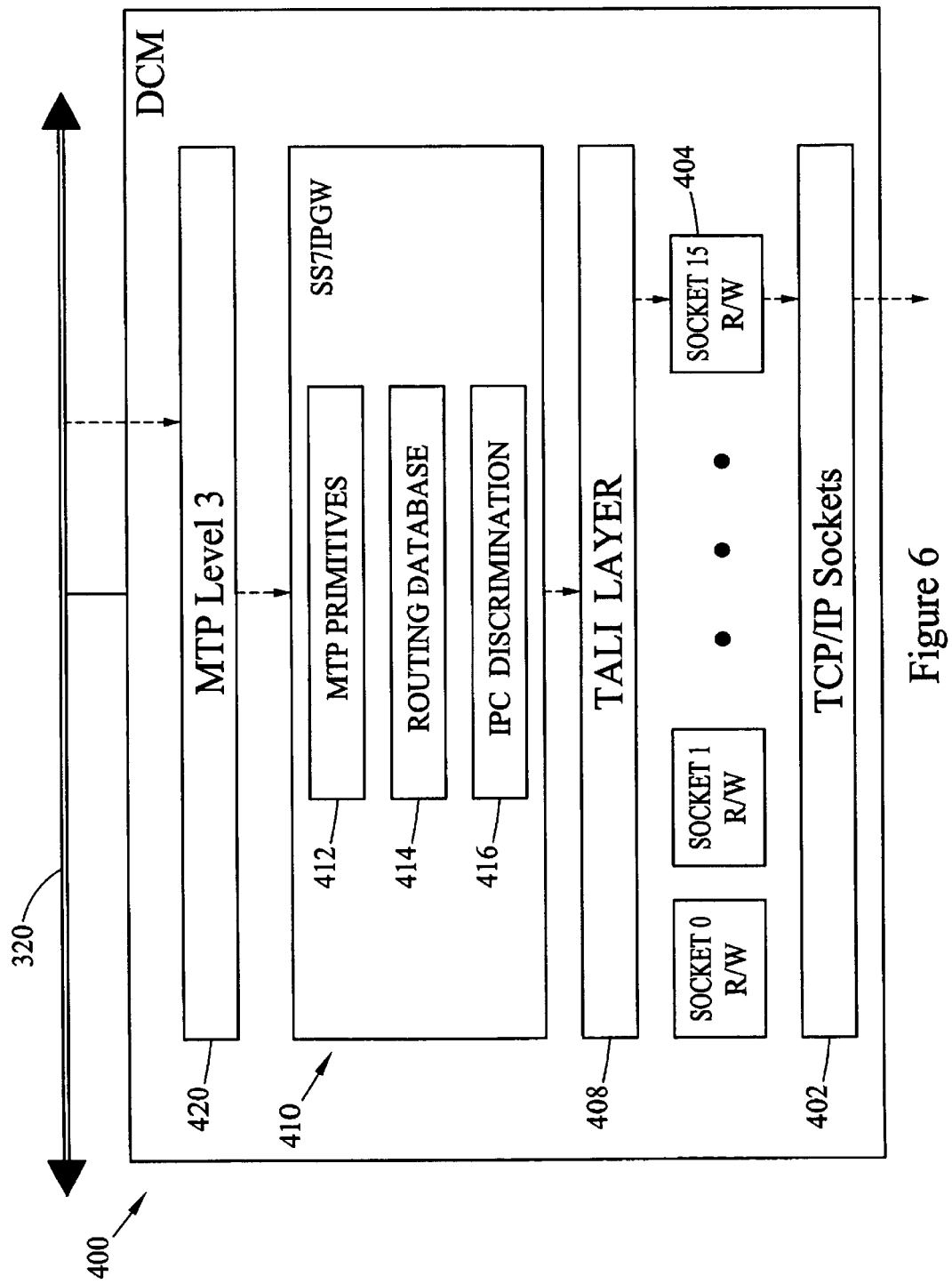
FIG. 6 is a block diagram of an IP-capable data communication module (DCM) according to an embodiment of the present invention.

FIG. 6 illustrates an exemplary data communication module according to an embodiment of the present invention, generally indicated by reference numeral 400. In the illustrated example, DCM 400 is connected to IMT communication bus 320 and implements a communications protocol stack including: a transmission control protocol/Internet protocol (TCP/IP) sockets module 402 for performing TCP/IP protocol functions for up to 16 TCP/IP sockets. TCP sockets module 402 includes physical layer functionality, such as Ethernet functionality, datalink layer functionality, network layer functionality, and transport layer functionality. DCM 400 also includes a plurality of TCP/IP socket read/write processes for buffering and performing input/output (I/O) type operations for each socket. In the example presented in FIG. 6, a typical socket read/write process is specifically identified as socket 15 R/W process 404. DCM 400 may also include a TALI layer 408 for adding/removing appropriate TALI header information to outgoing/incoming message packets, and an SS7IPGW layer 410, which acts as an interworking layer between TALI layer 408 and higher protocol layers. More particularly, in the embodiment shown in FIG. 6, SS7IPGW application layer 410 includes an MTP primitives process 412, a routing database 414, and an internal point code discrimination process 416. Each of these processes will now be explained in detail.

MTP primitives process 412 maps SS7 MTP-formatted signaling messages into TALI-formatted signaling messages, and vice-versa. Such mapping functionality may be applied to both network management messages and user part messages. Preferred packet formats for encapsulating various types of SS7 messages in TALI packets are described in Internet Engineering Task Force (IETF) RFC 3094: Tekelec's Transport Adapter Layer Interface, April 2001, the disclosure of which is incorporated herein by reference in its entirety. The present invention is not limited to using the TALI signaling protocol for sending and receiving SS7 messages over an IP network. Any suitable signaling adapter layer protocol may be used. For example, in an alternate embodiment, DCM 400 may implement M2PA, M2UA, M3UA and/or SUA over SCTP/IP, as described in Morneault et al., "Signaling System 7 (SS7) Message Transfer Part (MTP) 2—User Adaptation Layer," <draft-ietf-sigtran-m2ua-15.txt>, February 2002, Sidebottom et al., "SS7 MTP3-User Adaptation Layer (M3UA)," <draft-ietf-sigtran-m3ua-12.txt>, February 2002, Loughney et al., "Signaling Connection Control Part User Adaptation Layer," draft-ietf-sigtran-sua14.txt, June 2002, George et al., "SS7-User Peer-to-Peer Adaptation Layer (M2PA)," <draft-ietf-sigtran-m2pa-05.txt> May 2002, and RFC 2960: "Stream Control Transmission Protocol," October 2000, the disclosures of each of which are incorporated herein by reference in its entirety.

Routing database 414 includes a routing key table and a TCP/IP socket table. Table 5 shown below illustrates an exemplary routing key table. Table 5 has a plurality of routing key fields, including a destination point code field, a service indicator field, a subsystem number field, an originating point code field, a circuit identification code start (CICS) field, and a circuit identification code end (CICE) field.

TABLE 5

Routing Key Table

| DPC | SI | SSN | OPC | CICS | CICE | Sname0 | sname1 |
|---|---|---|---|---|---|---|---|
| 9-1-1 | 3 | 5 | | | | dcm1305s1 | dcm1307s1 |
| 9-9-9 | 5 | | 1-1-1 | 0 | 16383 | dcm1305s1 | dcm1307s1 |
| 9-9-9 | 5 | | 1-1-2 | 0 | 16383 | dcm1305s1 | dcm1307s1 |
| 9-9-9 | 5 | | 3-1-2 | 0 | 16383 | dcm1305s1 | dcm1307s1 |
| 3-1-2 | 3 | 5 | | | | dcm1305s2 | dcm1307s2 |
| 3-1-2 | 5 | | 1-1-1 | 0 | 16383 | dcm1305s2 | dcm1307s2 |
| 3-1-2 | 5 | | 1-1-2 | 0 | 16383 | dcm1305s2 | dcm1307s2 |
| 3-1-2 | 5 | | 3-1-1 | 0 | 16383 | dcm1305s2 | dcm1307s2 |

Two TCP/IP socket identifiers (i.e., sname0 and sname1), are associated with each entry in the routing key table. Either socket identifier may be used as an index to a particular entry in the socket table (Table 6).

Routing keys, such as those described above, may be used in SS7 routing nodes (e.g., in SGs and STPs) to determine how and where a signaling message packet should be routed. Many different combinations of signaling message parameters may be used to form a routing key. The particular structure presented in Table 5 is simply one of many possible routing key table structures and the present invention is not limited to this particular structure.

TABLE 6

TCP/IP Socket Table

| Sname | Lhost | Lport | Rhost | Rport | Status |
|---|---|---|---|---|---|
| dcm1305s1 | Dcm1305a | 5000 | hostp | 5000 | ok |
| dcm1305s2 | Dcm1305a | 5001 | hostq | 5001 | ok |
| dcm1307s1 | Dcm1307a | 7000 | hostp | 7000 | ok |
| dcm1307s2 | Dcm1307a | 7001 | hostq | 7001 | ok |

As indicated in Table 6, a TCP/IP socket table is indexed by socket identifier, where each identifier is associated with local end TCP/IP connection information and distant end TCP/IP connection information. A socket status parameter is also associated with each entry in Table 6. The socket status parameter indicates the availability status of each socket defined in the table.

Using the routing information contained in Tables 5 and 6, an outbound TALI signaling message may be directed to an appropriate TCP/IP socket for transmission into an associated IP network. More particularly, such TCP/IP socket selection may be made using at least a destination point code value contained in the signaling message.

IPC discrimination process 416 examines routing information contained in signaling messages received by DCM 400 for outbound processing. In one embodiment, IPC discrimination process 416 examines the destination point code field in a signaling message in order to determine whether the point code contained therein is an IPC value that was previously inserted by a communication module in EOS routing node 270. In response to determining that the point code contained in the message is an IPC value, discrimination process 416 may replace the IPC value with an appropriate, valid SS7 network point code prior to transmission of the outbound signaling message from EOS routing node 270. More particularly, discrimination process 416 may replace the IPC value with a point code shared between EOS routing node 270 and one or more remote applications.

Finally, DCM 400 also includes an MTP level 3 process 420 and additional processes beyond those depicted in FIG. 6. MTP level 3 process 420 may perform SS7 MTP level 3 routing and network management functions on behalf of one or more remote applications that implement higher SS7 layers. These functions will be described in more detail below.

The tables described above with respect to DCM 400 are merely illustrative of the types of data that can be employed to provide the functionality of a DCM. However, the present invention is not intended to be limited to these specific data structures. Any suitable data structures for implementing SS7 routing and network management functional on behalf of a remote application are intended to be with the scope of the invention. In addition, packets received and processed by DCM 400 are not limited to the above-described SS7 over TALI/TCP/IP and SS7 over M2PA, MxUA and SUA SCTP/IP protocols. DCM 400 may be configured to route signaling messages of any appropriate IP telephony protocol, including SIP, H.323, and MGCP.

Assigned User Part Message Processing Example

An SS7 user part, as used herein, is an application that operates at level 4 of the SS7 protocol stack. In general, signaling messages that contain user part information can be identified by a service indicator value. For example, ISUP messages may be identified by a service indicator of five. For the purposes of illustrating EOS routing node processing of a received SS7 signaling message that contains user part information for a remote application (e.g., a media gateway controller application), the routing of an ISUP initial address message (IAM) will be described below.

Figure 7:
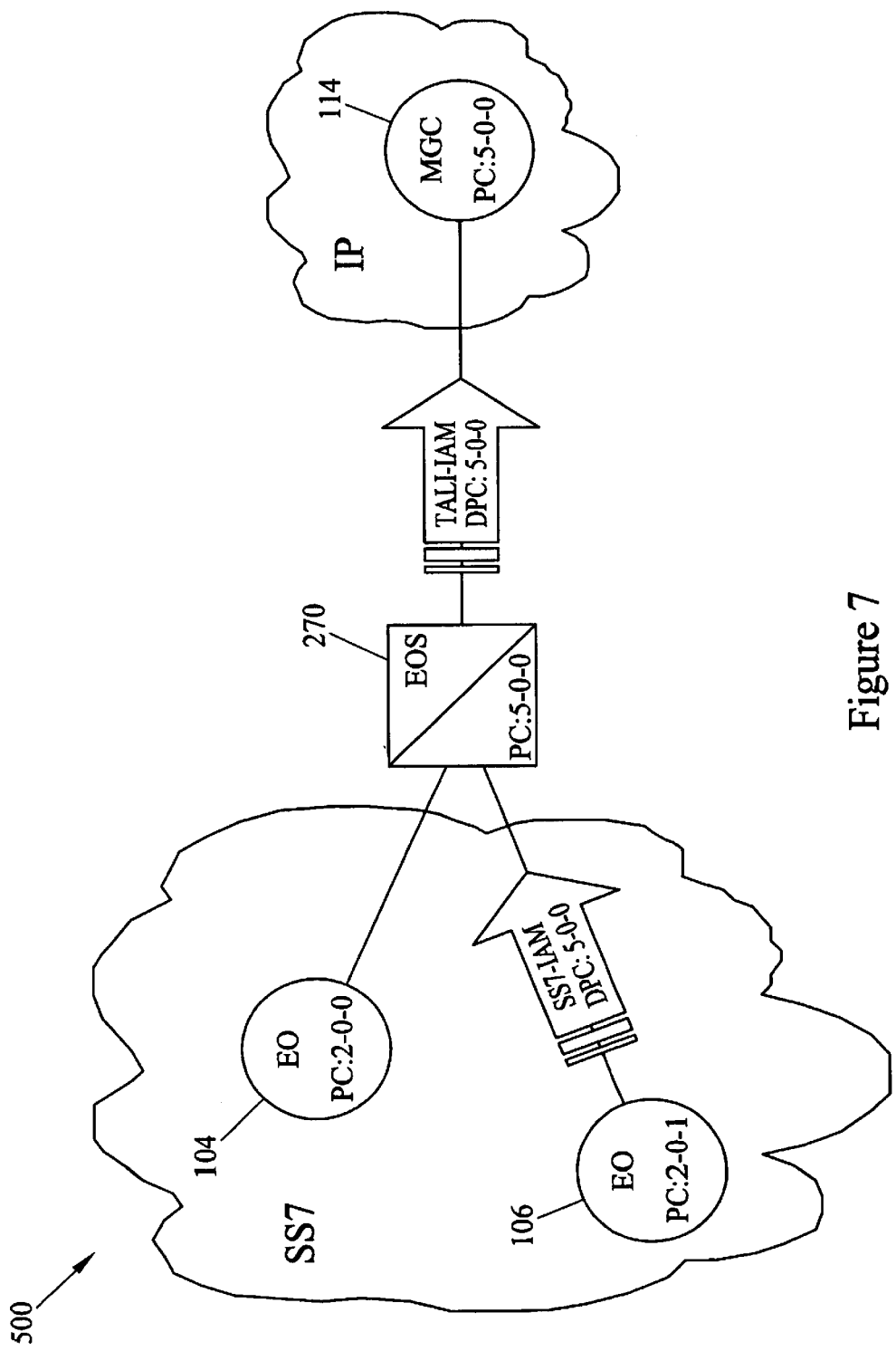
FIG. 7 is a network diagram illustrating exemplary routing of a signaling message destined to a user part assigned to a remote application that shares a point code with of an EOS routing node of the present invention.

FIG. 7 illustrates an exemplary converged signaling network environment 500 including an EOS routing node 270 and an attached MGC 114. Network 500 also includes a pair of SS7 end office nodes 104 and 106. In FIG. 7, an ISUP IAM signaling message is originated by SS7 EO node 106. The IAM message includes a DPC value of 5-0-0, which is the true point code of EOS routing node 270 and is shared with MGC 114.

Figure 8A:
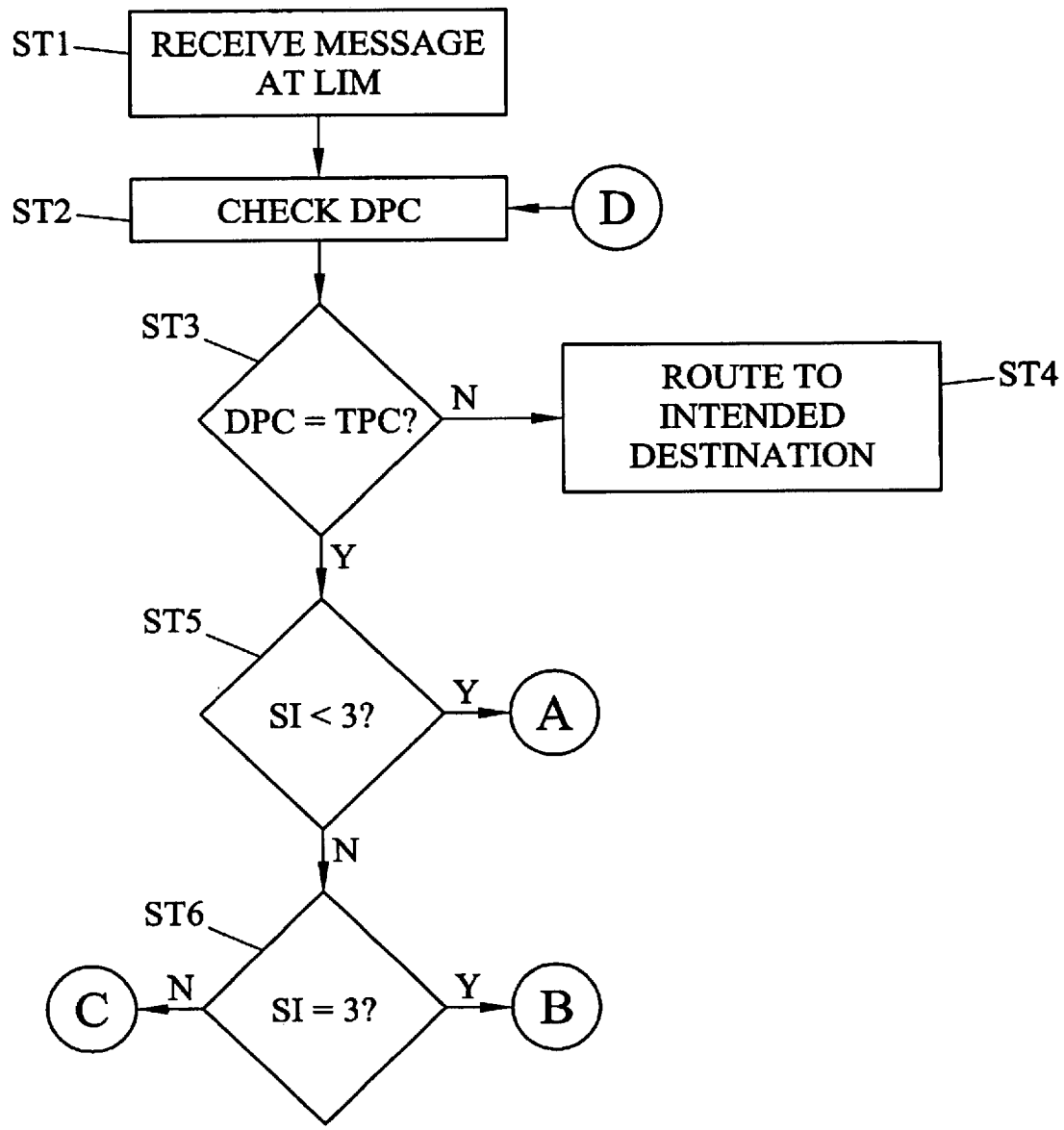
FIGS. 8A–8D are a flow chart illustrating exemplary processing of different message types by an EOS routing node according to an embodiment of the present invention.

FIGS. 8A–8D illustrate exemplary processing of various message types by EOS routing node 270. Referring to FIG. 8A, beginning with step ST1, a message is received at EOS routing node 270 by LIM 300. In this example, it is assumed that the message is and ISUP IAM message addressed to a remote application that shares the true point code of EOS routing node 270. MTP level 1 and 2 processing is performed on the message and the message is directed to HMDC module 308. HMDC module 308 examines a number of parameters in the received MSU, including a destination point code parameter contained in the MTP routing label of the message (step ST2 and ST3). If the DPC contained in the message is determined not to be a true point code associated with EOS routing node 270, then normal MTP routing processing is performed, and the message is routed to its intended destination (step ST4). However, if the DPC contained in the message is determined to be the true point code associated with EOS routing node 270 (i.e., DPC=5-0-0), as is the case in this example, the service indicator (SI) is checked to determine the message type.

Figure 8B:
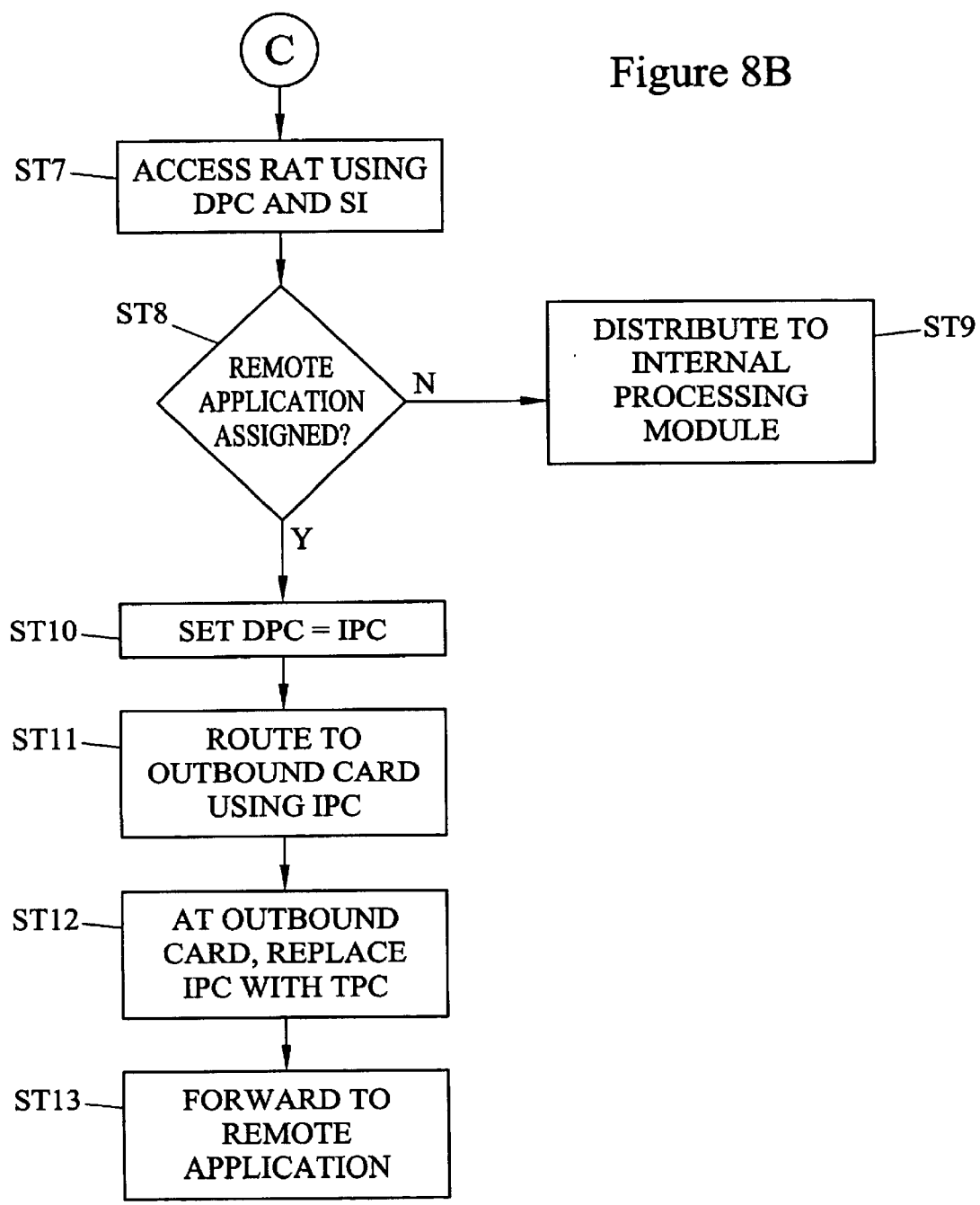
Figure 8C:
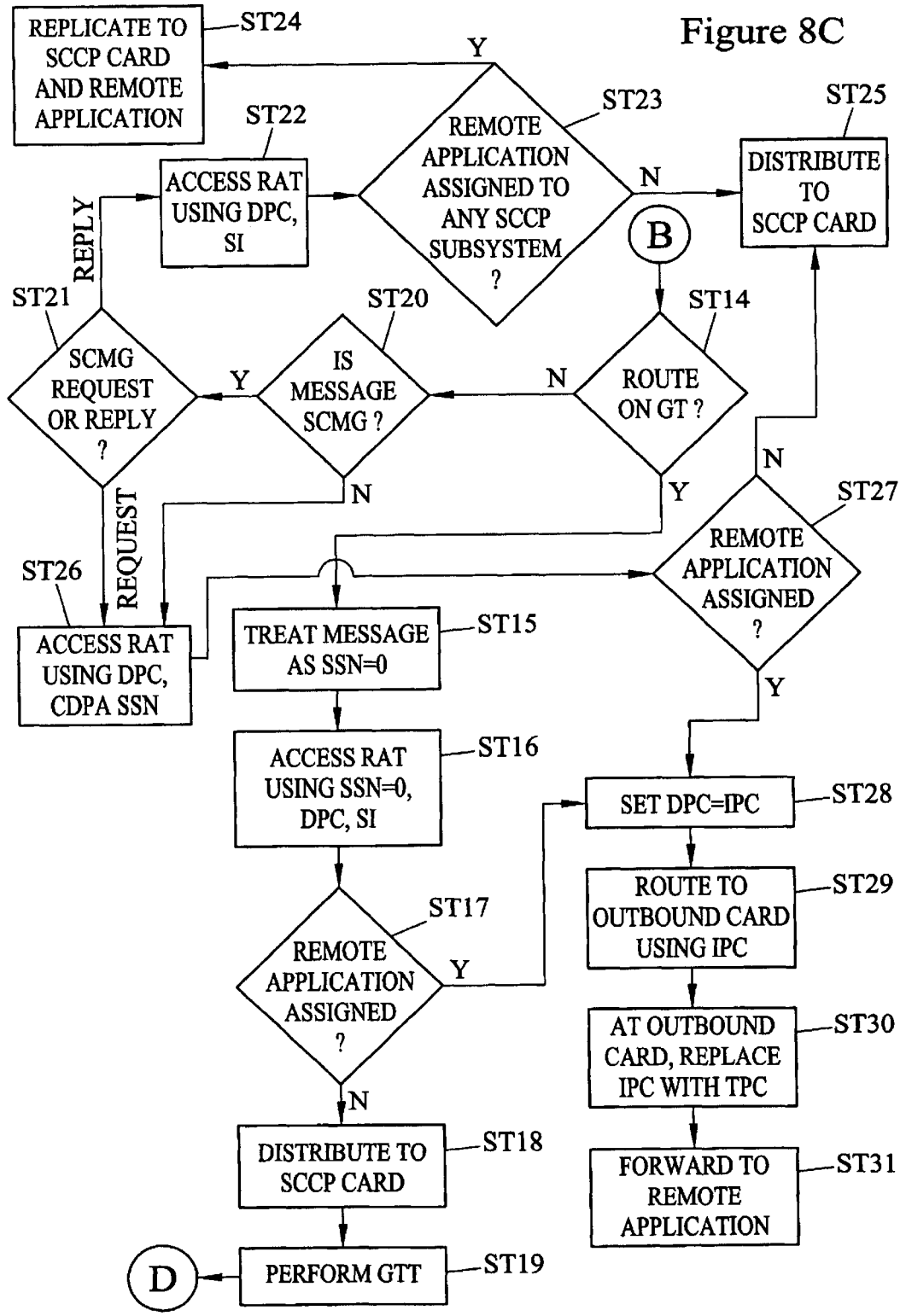
Figure 8D:
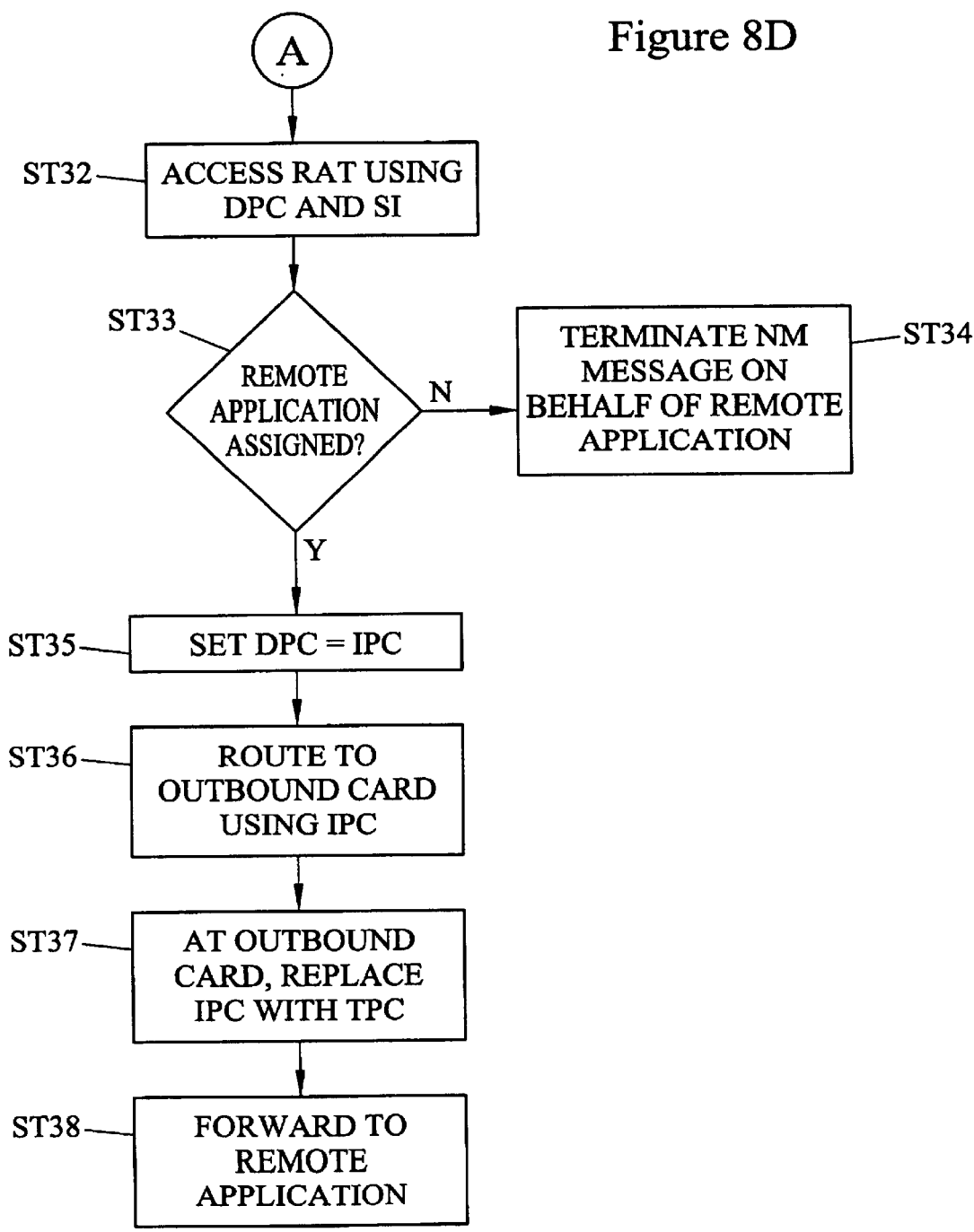

In step ST5, if the SI value is less than 3, the message is a network management message or a network test message, and control proceeds to the steps illustrated in FIG. 8D where network management processing is performed. Since ISUP messages have an SI value of 5, the test in step ST5 fails and control proceeds to step ST6, where it is determined whether the message has an SI value of 3, indicating that the message is an SCCP message. If the message is an SCCP message, control proceeds to the steps illustrated in FIG. 8C where SCCP processing is performed. Since the message is an ISUP message, the test in step ST6 fails, and control proceeds to the steps illustrated in FIG. 8B for ISUP message processing on behalf of a remote application.

Referring to FIG. 8B, the remote application table is accessed using the destination point code and the service indicator (step ST7). In step ST8, EOS routing node 270 determines whether a remote application has been assigned for the ISUP IAM message. If a remote application has not been assigned, in step ST9, the message is distributed to the appropriate internal processing module based on the DPC in the message. For an ISUP message, this would only occur if EOS routing node 270 implemented a user part layer.

If a remote application has been assigned, in step ST10, EOS routing node 270 sets the DPC in the message to an internal point code value based on the lookup in the remote application table. As discussed above, an internal point code, is a value used internally within EOS routing node 270 so that routing functions within EOS routing node 270 can be used to distribute messages to the outbound processing module associated with a remote application that shares a point code with EOS routing node 270. Accordingly, in step ST11, the message is routed to an outbound processing card using the internal point code. In this example, the internal point code of 9-9-9 is inserted in the message and used to distribute the message to DCM 400 using the routing and link set table described above. At DCM 400, the internal point code in the message is replaced with the true point code of end office support routing node 270 (step ST12). In step ST13, DCM 400 forwards the ISUP IAM message to the remote application. Forwarding the message to the remote application may include encapsulating the ISUP message in an appropriate adapter layer packet and encapsulating the adapter layer packet in a format suitable for communicating with the remote application. For example, DCM 400 may encapsulate the ISUP message in a TALI/TCP/IP message, an M2UA/SCTP/IP message, an M2PA/SCTP/IP message or an M3UA/SCTP/IP message. Once the message is encapsulated in the appropriate format, the message is forwarded to the remote application. Thus, as illustrated in FIG. 8B, EOS routing node 270 is capable of determining whether user part messages that are addressed to a point code shared by EOS routing node 270 and a remote application should be distributed to the remote application.

Another type of remote application that may share a point code with EOS routing node 270 is a remote application part, such as a transaction capabilities application part or a mobile application part. Since application parts use SCCP routing in order to get to a remote application, EOS routing node 270 is preferably capable of determining whether SCCP messages should be distributed to a remote application that shares its point code. FIG. 8C illustrates exemplary steps that may be performed by EOS routing node 270 in determining whether certain types of SCCP messages should be routed to a remote application.

Referring again to FIG. 8A, in this example, it is assumed that the received message is an SCCP message with an SI value of 3. Accordingly, the test in step ST6 proceeds along the branch labeled "Y," and control proceeds to the steps illustrated in FIG. 8C for SCCP message processing. Referring to FIG. 8C, since some SCCP messages require global title translation prior to final routing, in step ST14, EOS routing node 270 determines whether the routing indicator and the message indicates route on global title. If the message indicates route on global title, the subsystem number in the message cannot be used to reliably perform the lookup in the remote application table because the subsystem number may be changed by the global title translation. Accordingly, in step ST15, the message is treated as subsystem number=zero. In step ST16, the remote application table is accessed using subsystem number zero, the destination point code, and the service identifier.

In step ST17 it is determined whether a remote application is assigned to the combination of parameters used in the lookup. The remote application table is preferably provisioned so that this combination of identifiers from the signaling message results in a determination that the message is not assigned to remote application. Accordingly, in step ST18, the message is distributed to an SCCP card within EOS routing node 270. In step ST19, the SCCP card performs global title translation on the message. Because global title translation results in a new point code and/or subsystem number assigned to the message, and the new point code may be the true point code shared with a remote application control returns to step ST2 illustrated in FIG. 8A where the process for determining whether the message is addressed to a remote application that shares a point code with EOS routing node 270 is repeated. The translated message is still an SCCP message, so step ST6 in FIG. 8A results in control proceeding to the steps illustrated in FIG. 8C for SCCP message processing. However, this time, the message is not "route on GT." Accordingly, the test in step ST14 fails and control proceed to step ST20 where EOS routing node 270 determines whether the message is an SCCP management (SCMG) message. If the message is determined to be an SCMG message, in step ST21, EOS routing node 270 determines whether the SCMG message is a request or a reply. If the SCMG message is a reply, in step ST22, the remote application table is accessed using the DPC and SI in the message. In step ST23, it is determined whether a remote application is assigned to any SCCP subsystem. If a remote application is assigned, in step ST24, the message is replicated to the SCCP card in EOS routing node 270 and to the assigned remote application. If a remote application is not assigned to any SCCP subsystem, the message is distributed to the local SCCP card (step ST25).

In step ST21, if the SCMG message is determined to be a request or if the SCCP message is determined not to be an SCMG message in step ST20, control proceeds to step ST26 where the remote application table is accessed using the destination point code and the called party subsystem number in the message. Control then proceeds to step ST27 through step ST31, where it is determined whether a remote application is assigned, and if so, the message is forwarded to the remote application.

More particularly, in step ST27, if a remote application is assigned, control proceeds to step ST28 where the DPC in the message is set to the IPC extracted from the remote application table entry. In step ST29, the message is routed to the outbound card associated with the particular IPC. In step ST30, the IPC discrimination function on the outbound card replaces the IPC with the TPC of EOS routing node 270. In step ST28, the message is forwarded to the remote application. In step ST27, if it is determined that a remote application is not assigned to this combination of indicators, in step ST25 where the message is distributed to the SCCP card for SCCP processing. Thus, the steps in FIG. 8C illustrate that EOS routing node 270 is capable of correctly processing SCCP messages and selectively delivering the SCCP messages to a remote application that shares its point code.

Yet another case for SCCP message processing that is not illustrated in FIG. 8C is the case where an SCCP message arrives that has either an invalid subsystem or a subsystem of zero and does not require global title translation and is not an SCCP management message. In this case, EOS routing node 270 preferably treats the message as if it were assigned a subsystem number of zero, accesses the remote application table, and distributes the message to the SCCP card within EOS routing node 270. According to an important aspect of the invention, EOS routing node 270 implements MTP network management functions on behalf of a remote application or applications that share its point code. FIG. 8D illustrates exemplary steps that may be performed by EOS routing 270 in performing network management functions on behalf of a remote application. Returning to FIG. 8A, in ST1, it is assumed that a message is received at LIM 300. In steps ST2 and ST3, EOS routing node 270 determines whether the destination point code is addressed to the shared true point code. If the message is not addressed to the true point code of EOS routing node 270, in step ST4, the message is routed to its intended destination.

If, however, the message is addressed to a true point code of EOS routing node 270, then the message is a candidate for a remote application. In step ST5, the message is identified as an MTP3 network management message or a network test message. MTP3 network management messages are identified by a service identifier value of 0. Network test messages are identified by SI values of 1 and 2. In this example, it is assumed that the message is an MTP3 network management message with SI=0. Accordingly, control proceeds to the steps illustrated in FIG. 8D where network management processing is performed.

Referring to FIG. 8D, in step ST32, EOS routing node 270 accesses the remote application table using the destination point code and service identifier in the message. In step ST33, EOS routing node 270 determines whether a remote application has been assigned for the network management message. If a remote application has not been assigned for the network management message, EOS routing node 270 terminates the network management message on behalf of the remote application (step ST34). This is the normal case because EOS routing node 270 implements SS7 layers 1–3 on behalf of the remote application. MTP3 network management messages are used to update routing tables within EOS routing node 270 and are not required to be sent to the remote application.

Some MTP3 network management messages carry information regarding higher-level applications, such as level four applications. Examples of these types of messages are user part unavailable (UPU) messages that indicate that a remote level four application is unavailable and transfer controlled (TFC) messages, sent by remote level four applications to indicate congestion. These messages may be of interest to EOS routing node 270 and/or the remote application. Accordingly, in step ST35, if a remote application is assigned to the combination of parameters extracted from the network management message, the destination point code in the message is set to the internal point code extracted from the remote application. In step ST36, the message is routed to the outbound card using the internal point code. In step ST37, the internal point code is replaced with the true point code of EOS routing node 270. In step ST38, the message is forwarded to the remote application. The message may also be replicated to MTP network management functions within EOS routing node 270. Thus, as illustrated in FIG. 8D, and in Table 2 above, EOS routing node 270 performs network management functions on behalf of remote applications that share its point code. This operation greatly simplifies remote application design and allows multiple remote applications to be supported by a single EOS routing node 270.

Figure 9:
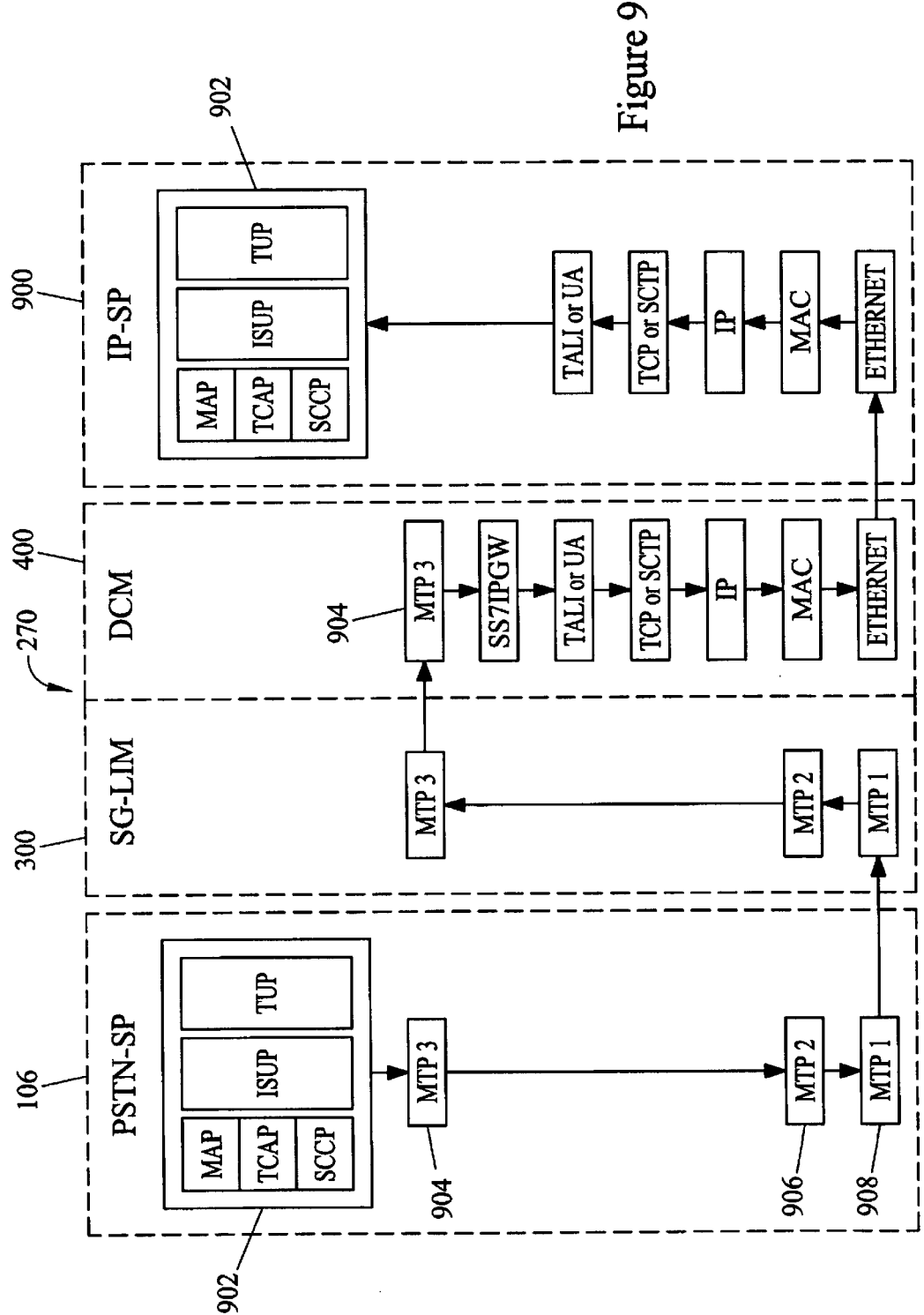
FIG. 9 is a block diagram of an EOS routing node and a remote SS7 level 4 application in which the EOS routing node implements SS7 layers 1–3 on behalf of the remote application according to an embodiment of the present invention.

FIG. 9 illustrates some of the principal advantages of EOS routing node 270. Referring to FIG. 9, EOS routing node 270 is connected to a PSTN signaling point 106 and an IP signaling point 900. PSTN signaling point 106 includes SS7 user and application parts 902, an MTP3 layer 904, an MTP2 layer 906, and an MTP1 layer 908. IP signaling point 900, like PSTN signaling point 106, includes SS7 user and application parts 902. However, IP signaling point 900 is not required to have an MTP3 layer 904 because the MTP3 layer associated with IP signaling point 900 resides on EOS routing node 270. Allowing IP signaling point 900 to avoid implementing MTP layer 3 greatly simplifies the design of IP signaling point 900. In addition, because IP signaling point 900 shares a point code with EOS routing node 270, network point codes are conserved.

As stated above, EOS routing node 270 performs network management functions on behalf of one or more applications. If EOS routing node 270 performs network management on behalf of a single remote application and the remote application or transport to the remote application becomes unavailable, EOS routing node 270 may send appropriate level 4 response messages to network nodes on behalf of the remote application in response to receiving messages for the remote application. These procedures will be described in detail below with regard to FIG. 10. Alternatively, if communications with a single remote application fail and the sole purpose of EOS routing node 270 is to route messages to and from the remote application, EOS routing node 270 may implement a procedure, such as processor outage, to disable MTP3 communications with the outside network while maintaining MTP levels 1 and 2 communications with the outside network.

When multiple applications are connected to EOS routing node 270 and all links or sockets to one application become unavailable but at least one link or socket to another application is still available, it is preferred to prevent traffic from being sent to the unavailable application without preventing traffic from being sent to the available application. Normally, when all links to a particular point code become unavailable, MTP network management functions broadcast transfer prohibited (TFP) messages to adjacent nodes. However, when the point code is shared by multiple applications and only one of the applications is unavailable, a mechanism needs to be devised in order to continue forwarding traffic to one application but not the other application.

Figure 10:
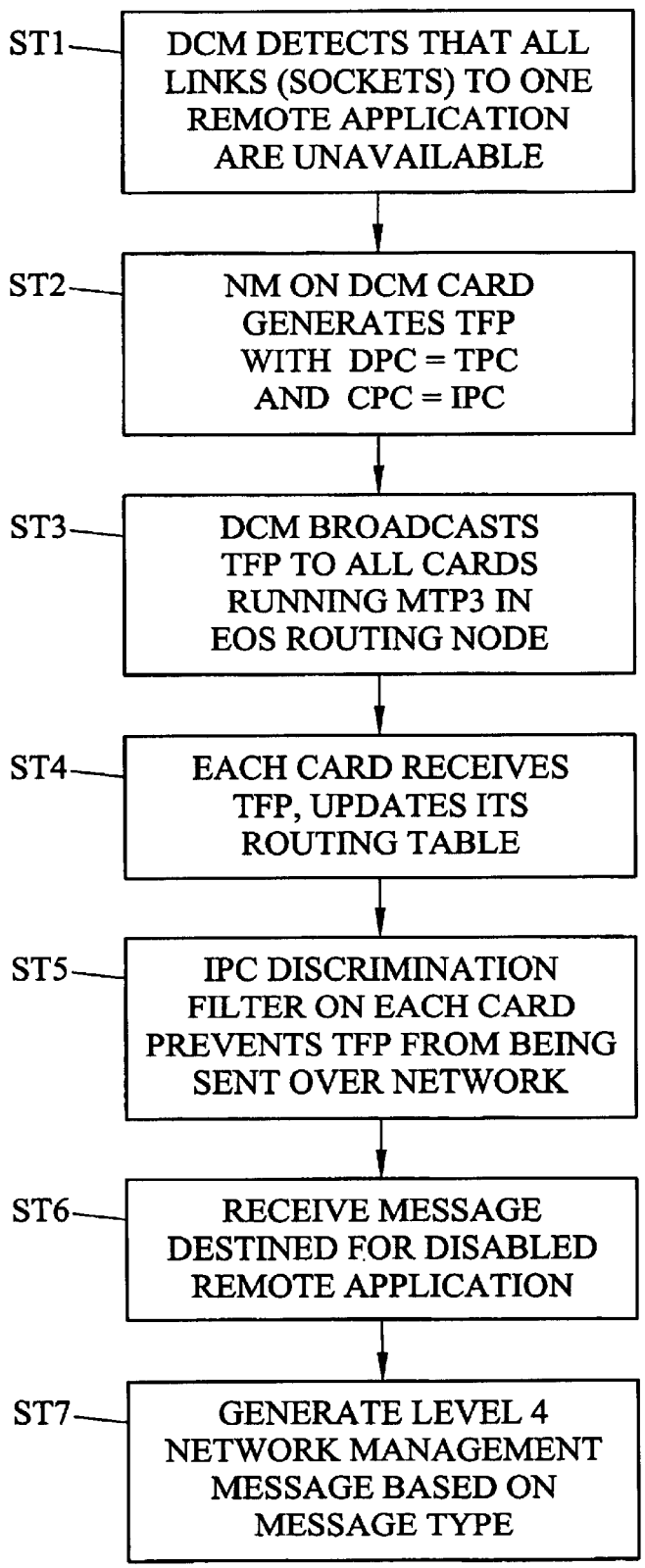
FIG. 10 is a flow chart illustrating exemplary network management functions performed by EOS routing node 270 on behalf a remote application that shares its point code according to an embodiment of the present invention.

FIG. 10 illustrates exemplary steps that may be performed by EOS routing node 270 in performing network management on behalf of multiple remote applications when one of the remote applications becomes unavailable and the other remote application is not unavailable. Referring to FIG. 12, in step ST1, DCM 400 detects that all links or sockets to one remote application are unavailable. In step ST2, the MTP3 network management function on DCM 400 generates a transfer prohibited message with the destination point code set to the true point code of EOS routing node 270. The concerned point code in the TFP message is set to an internal point code value that uniquely identifies the disabled application. This value may be obtained by performing a lookup in the remote application table on DCM 400 using the signaling identifier, subsystem number, and true point code that correspond to the disabled application. For example, if the attached application is an SCCP application, then the subsystem number, signaling identifier, and TPC value would be used. If the attached application is an ISUP application, then the signaling identifier and the true point code would be used.

In step ST3, DCM 400 broadcasts the TFP message to all cards running MTP3 in EOS routing node 270. In step ST4, each card receives the TFP message and updates its routing table to indicate that a route associated with the particular IPC is unavailable. However, rather than sending the TFP to adjacent nodes as in normal MTP3 network management, in step ST5, the IPC discrimination function on each card prevents the TFP message from being sent over the network.

If a message arrives at EOS routing node 270 destined for a remote application that has become unavailable as in step ST6, EOS routing node 270 may generate an appropriate SS7 level 4 network management message based on the message type (step ST7). For example, if a received message is an ISUP message destined for an unavailable remote ISUP application, EOS routing node 270 may generate a user part unavailable (UPU) message concerning its true point code and the ISUP user part and route the UPU message to the originator of the undelivered ISUP message. In another example, EOS routing node 270 may receive an SCCP route-on-subsystem message destined for an unavailable SCCP subsystem when other remote SCCP subsystems are available. In this situation, EOS routing node 270 may generate an SCCP subsystem prohibited (SSP) message identifying the out of service subsystem and route the message to the originator of the undelivered SCCP message. Thus, using the steps illustrated in FIG. 10, an EOS routing node according to the present invention is capable of performing network management on behalf of multiple applications when the multiple applications share the same point code without disabling communications to all applications when one of the applications becomes unavailable.

Although in the examples described above, EOS routing node 270 includes a single true point code, the present invention is not limited to such an embodiment. As described in commonly-assigned, co-pending U.S. patent application Ser. No. 09/969,173, filed Sep. 28, 2001, the disclosure of which is incorporated herein by reference in its entirety, a signaling message routing node may recognize multiple point codes as it own point codes. These point codes are referred to as true point codes and secondary true point codes. According to the present invention, EOS routing node 270 may share its true point code and/or any of its secondary true point codes with one or more remote applications without departing from the scope of the invention.

It will be appreciated that various details of the invention may be changed without departing from the scope of the invention. Furthermore, the foregoing description is for the purpose of illustration only, and not for the purpose of limitation—the invention being defined by the claims.

What is claimed is:

1. A method for allowing a routing node and a remote application to share a point code in a communications network, the method comprising:
   (a) receiving, at a routing node, a first signaling message addressed to a point code shared by the routing node and a remote application;
   (b) extracting an identifier from the first signaling message and performing a lookup in a remote application table based on the identifier;
   (c) determining, based on the lookup, whether a remote application is provisioned for the identifier; and
   (d) in response to determining that a remote application is provisioned for the identifier, forwarding application level information from the first signaling message to the remote application.

2. The method of claim 1 wherein extracting an identifier from the first signaling message includes extracting a service indicator (SI) value from the first signaling message.

3. The method of claim 1 wherein extracting an identifier from the first signaling message includes extracting a signaling connection control part (SCCP) called party subsystem (SSN) parameter from the first signaling message.

4. The method of claim 1 wherein determining whether a remote application is provisioned for the identifier includes determining whether a remote SS7 user part layer is provisioned for the identifier.

5. The method of claim 1 wherein determining whether a remote application is provisioned for the identifier includes determining whether a remote SS7 application part layer is provisioned for the identifier.

6. The method of claim 1 wherein forwarding application level information from the first signaling message to a remote application includes forwarding the application level information to an IP signaling point implementing an SS7 user part.

7. The method of claim 1 wherein forwarding application level information from the first signaling message to a remote application includes forwarding the application level information to an IP signaling point implementing an SS7 application part.

8. The method of claim 1 comprising, in response to determining that a remote application is provisioned for the identifier, replacing the point code in the first signaling message with an internal point code uniquely identifying the remote application.

9. The method of claim 8 comprising distributing the first message within the routing node based on the internal point code.

10. The method of claim 9 wherein distributing the message based on the internal point code includes routing the message to a communications module based on the internal point code.

11. The method of claim 10 comprising, at the communication module, detecting the internal point code in the signaling message and replacing the internal point code with the point code of the routing node.

12. The method of claim 8 wherein the internal point code is a signaling system 7 point code.

13. The method of claim 1 wherein forwarding application level information from the first message to a remote application includes creating a second message including the application level information and routing the second message to the remote application.

14. The method of claim 13 wherein the second message is a transport adapter layer interface (TALI) protocol signaling message.

15. The method of claim 13 wherein the second message includes an SS7 adaptation layer.

16. The method of claim 1 wherein the remote application comprises an end office.

17. The method of claim 1 wherein the remote application comprises a media gateway controller.

18. The method of claim 1 wherein the remote application comprises a database node.

19. A method for providing signaling system 7 network management support for a remote SS7 level 4 application that shares a point code of a routing node, the method comprising:
   (a) receiving, at a routing node, network management messages addressed to a point code shared by the routing node and a remote SS7 level 4 application;
   (b) selectively screening the network management messages on behalf of the remote application to determine whether indicators in the network management messages have been assigned to a remote application;
   (c) forwarding network management messages that pass the screening to the remote application; and
   (d) terminating network management messages that fail the screening at the routing node.

20. The method of claim 19 wherein receiving network management messages includes receiving MTP level 3 network management messages.

21. The method of claim 19 wherein receiving network management messages includes receiving SCCP management (SCMG) messages.

22. The method of claim 21 comprising determining whether the SCCP network management messages are requests or replies.

23. The method of claim 22 comprising, in response to determining that the SCCP management messages are requests, determining whether a remote application has been assigned to the requests, and, in response to determining that a remote application has been assigned, forwarding the requests to the remote application.

24. The method of claim 22 comprising, in response to determining that the SCCP management messages are replies, determining whether a remote application has been assigned to the replies, and, in response to determining that a remote application has been assigned, replicating the replies to subsystems within the routing node and to a remote application.

25. The method of claim 19 wherein forwarding the network management messages to a remote application includes replacing destination point codes in the network management messages that pass the screening with a point code internal to the routing node, routing the messages to an outbound card within the routing node using the internal point code, replacing the internal point code with a true point code of the routing node, and forwarding the network management messages to the remote application over a network.

26. The method of claim 19 wherein terminating the network management messages includes updating MTP3 routing tables in the routing node using information extracted from the network management messages.

27. A method for performing network management on behalf of a plurality of remote applications that share a true point code of a network routing node, the method comprising:
   (a) detecting a network management event indicating failure of communications with one application of a plurality of applications that share a true point code of a network routing node;

(b) generating a network management messages indicative of the event and broadcasting the network management messages to cards in the routing node including network routing tables;

(c) updating the routing tables on the cards to indicate unavailability of a route to the disabled application; and (d) at each card in the routing node that interfaces with an external signaling link, preventing distribution of the network management messages to adjacent nodes.

28. The method of claim 27 wherein detecting failure of communications with one application includes detecting failure of all sockets or sessions associated with the application.

29. The method of claim 27 wherein generating network management messages includes generating SS7 transfer prohibited messages.

30. The method of claim 29 wherein generating SS7 transfer prohibited messages includes generating SS7 transfer prohibited messages with a destination point code corresponding to the true point code of the routing node and a concerned point code equal to an internal point code uniquely identifying the disabled application.

31. The method of claim 30 wherein preventing distribution of the network management messages to adjacent nodes includes filtering the network management messages based on the internal point code.

32. A method for performing SS7 network management on behalf of a remote application that shares a point code with a routing node, the method comprising:

(a) at a routing node, receiving a signaling message addressed to a remote application that shares a point code with the routing node;

(b) determining whether communications with the remote application are unavailable; and (c) in response to determining that communications with the remote application are unavailable, generating a network management message on behalf of the remote application based on the signaling message type and forwarding the network management message to the originator of the signaling message.

33. The method of claim 32 wherein receiving a signaling message includes receiving an ISUP message destined for a remote ISUP user part and wherein generating a network management message on behalf of the remote application includes generating a user part unavailable message concerning the point code of the routing node and the ISUP user part.

34. The method of claim 32 wherein receiving a signaling message includes receiving an SCCP message addressed to a remote SCCP subsystem and wherein generating a network management message on behalf of the remote application includes generating an SCCP subsystem prohibited message identifying the remote SCCP subsystem.

35. The method of claim 32 comprising, in response to determining that communications with the remote application are unavailable, disabling level 3 communications with external nodes to prevent further signaling messages from being received until communications with the remote application resume.

36. A routing node capable of sharing a point code with one or more remote applications, the routing node comprising:

(a) a first communications module for receiving signaling messages addressed to a point code shared by the routing node and a remote application;

(b) a first discrimination application for determining whether one or remote applications have been assigned to process the signaling messages; and (c) a second communications module for receiving the signaling messages from the first discrimination application, for encapsulating application level information from the signaling messages in Internet protocol (IP) packets and forwarding the IP packets to the remote applications assigned to process the signaling messages.

37. The routing node of claim 36 wherein the first communications module is an SS7 link interface module (LIM).

38. The routing node of claim 36 wherein the second communications module is an SS7/IP data communication module (DCM).

39. The routing node of claim 36 wherein the first discrimination application is adapted to replace destination point codes contained in the received signaling messages with internal point codes (IPCs).

40. The routing node of claim 39 wherein the first communications module is adapted to route the signaling messages to the second communications module using the IPCs.

41. The routing node of claim 39 wherein the second communications module includes a second discrimination application for replacing the IPCs contained in the signaling messages with the shared point code.

42. The routing node of claim 36 wherein the first discrimination application is adapted to determine whether a remote application is assigned to process the signaling messages by examining a service indicator (SI) parameter contained in the signaling messages.

43. The routing node of claim 36 wherein the first discrimination application is adapted to determine whether a remote application is assigned to process the signaling messages using a signaling connection control part (SCCP) called party subsystem (SSN) parameter contained in the signaling messages.

44. The routing node of claim 36 wherein the second communications module is adapted to implement MTP layers 1–3 on behalf of the remote applications.

45. The routing node of claim 36 comprising a remote application table accessible by the first discrimination application for determining whether signaling messages should be forwarded to the remote applications.

* * * * *